US012679348B2

(12) United States Patent (10) Patent No.: US 12,679,348 B2
Iizuka (45) Date of Patent: Jul. 14, 2026

(54) IN-VEHICLE ELECTRONIC CONTROL DEVICE

(71) Applicant: HITACHI ASTEMO, LTD., Hitachinaka (JP)

(72) Inventor: Jyunya Iizuka, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 93 days.

(21) Appl. No.: 18/723,936

(22) PCT Filed: Aug. 25, 2022

(86) PCT No.: PCT/JP2022/032083
§ 371 (c)(1),
(2) Date: Jun. 25, 2024

(87) PCT Pub. No.: WO2023/145117
PCT Pub. Date: Aug. 3, 2023

(65) Prior Publication Data
US 2025/0050875 A1 Feb. 13, 2025

(30) Foreign Application Priority Data
Jan. 31, 2022 (JP) ................................. 2022-013405

(51) Int. Cl.
*B60W 30/09* (2012.01)
*G06V 20/58* (2022.01)

(52) U.S. Cl.
CPC ............. *B60W 30/09* (2013.01); *G06V 20/58* (2022.01)

(58) Field of Classification Search
CPC .......... B60W 30/09; G08G 1/16; G06V 20/58
See application file for complete search history.

(56) References Cited

U.S. PATENT DOCUMENTS 10,759,421 B2 * 9/2020 Nagata ................... B60W 50/14
10,960,878 B2 * 3/2021 Nagata ................... B60W 50/14
(Continued)

FOREIGN PATENT DOCUMENTS

JP     H06148328 A  *  5/1994
JP     2018-512323 A     5/2018
(Continued)

OTHER PUBLICATIONS

Machine Translation of Takero's reference (JPH-06148328-A) (Year: 1994).*
(Continued)

*Primary Examiner* — Tarek Elarabi
(74) *Attorney, Agent, or Firm* — Foley & Lardner LLP

(57) ABSTRACT

A processing device in an in-vehicle electronic control device recognizes a travelable area on a road surface around a host vehicle that the host vehicle enters, based on a result of an integration process, sets an avoidance target for avoiding a collision with an object predicted to collide when a collision between the host vehicle and the object is predicted, generates an avoidance route in the travelable area, the avoidance route leading to the avoidance target, sets an entering object detection area around the host vehicle to detect entry of the object, and detects the object having entered the entering object detection area based on object information of the object, detected by a plurality of external sensors, before the integration process, and determines whether to execute an avoidance operation along the avoidance route based on a result of the detection.

2 Claims, 15 Drawing Sheets

☒ : LONG-RANGE SENSOR
▓ : WIDE-ANGLE SENSOR
● : SHORT-RANGE SENSOR

(56)                    References Cited

U.S. PATENT DOCUMENTS

| | | | |
|---|---|---|---|
| 2018/0050694 A1* | 2/2018 | Schroeder | G01S 13/89 |
| 2018/0312163 A1* | 11/2018 | Minemura | B60T 7/22 |
| 2019/0039614 A1* | 2/2019 | Nagata | B60W 10/20 |
| 2019/0202450 A1* | 7/2019 | Maeda | B60W 30/09 |
| 2020/0346645 A1* | 11/2020 | Nagata | B60W 10/18 |
| 2021/0229658 A1* | 7/2021 | Tsuji | B60W 60/0016 |
| 2021/0237666 A1* | 8/2021 | Futa | G06V 20/56 |
| 2023/0386340 A1* | 11/2023 | Takeyasu | B60W 30/09 |
| 2025/0050875 A1* | 2/2025 | Iizuka | B60W 30/09 |

FOREIGN PATENT DOCUMENTS

| | | | |
|---|---|---|---|
| JP | 2021-115971 A | 8/2021 | |
| JP | 2021-125557 A | 8/2021 | |
| JP | 6956932 B1 | 11/2021 | |

OTHER PUBLICATIONS

International Search Report with English Translation and Written Opinion of International Patent Application No. PCT/JP2022/032083 dated Nov. 8, 2022 (8 pages).

* cited by examiner

▨ : LONG-RANGE SENSOR

■ : WIDE-ANGLE SENSOR

● : SHORT-RANGE SENSOR

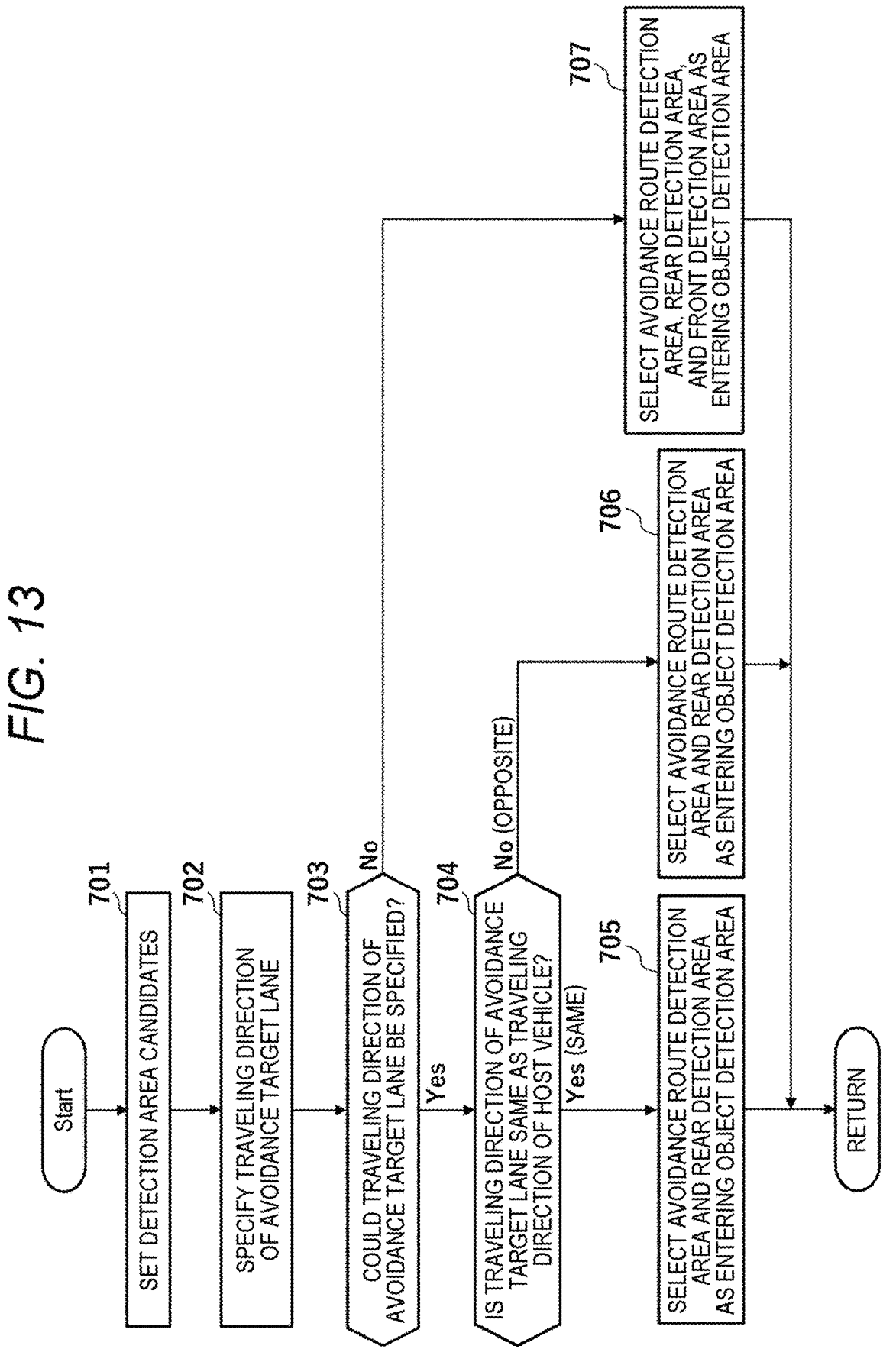

Start

701 — SET DETECTION AREA CANDIDATES

702 — SPECIFY TRAVELING DIRECTION OF AVOIDANCE TARGET LANE

703 — COULD TRAVELING DIRECTION OF AVOIDANCE TARGET LANE BE SPECIFIED?

No → 707 — SELECT AVOIDANCE ROUTE DETECTION AREA, REAR DETECTION AREA, AND FRONT DETECTION AREA AS ENTERING OBJECT DETECTION AREA

Yes

704 — IS TRAVELING DIRECTION OF AVOIDANCE TARGET LANE SAME AS TRAVELING DIRECTION OF HOST VEHICLE?

No (OPPOSITE) → 706 — SELECT AVOIDANCE ROUTE DETECTION AREA AND REAR DETECTION AREA AS ENTERING OBJECT DETECTION AREA

Yes (SAME) → 705 — SELECT AVOIDANCE ROUTE DETECTION AREA AND REAR DETECTION AREA AS ENTERING OBJECT DETECTION AREA

RETURN

IN-VEHICLE ELECTRONIC CONTROL DEVICE

TECHNICAL FIELD

The present invention relates to an in-vehicle electronic control device.

BACKGROUND ART

Various driving assistance systems have been developed for the purpose of supporting a driver of an automobile, avoiding a collision with another automobile or the like, and reducing the influence of the collision. Typical examples of the driving assistance system include autonomous emergency braking (AEB) that automatically starts braking and prevents or reduces a collision with an object such as another automobile present in front of the automobile when the collision is predicted. Furthermore, a driving assistance system is also being considered to avoid a collision between a host vehicle and an object when it is determined that AEB cannot prevent a collision with the object, by not only braking but also performing automated steering, which involves a change in the traveling direction of the automobile, or providing steering assistance for the driver. In this system, since the avoidance operation involves a change in the traveling direction of the automobile, it is necessary to perform monitoring so that the host vehicle does not come into contact with objects excluding the object predicted to collide.

Such a driving assistance system performs control for supporting a driver based on information detected by a plurality of external sensors mounted on an automobile. In recent years, sensor fusion technology for integrating detection results of a plurality of external sensors and recognizing an object in a wide range around the host vehicle with high accuracy has been incorporated in the driving assistance system. Information integrated by sensor fusion technology has higher reliability than information output from the external sensor alone.

PTL 1 discloses an invention in which sensor fusion technology is used in a method and a device for monitoring a target trajectory to be traveled by a vehicle for the absence of collisions in highly automated traveling. PTL 1 describes that a free space around the vehicle is specified based on fused sensor data, and a target trajectory is checked for the absence of collisions based on the specified free space.

CITATION LIST

Patent Literature

PTL 1: JP 2018-512323 A

SUMMARY OF INVENTION

Technical Problem

When the traveling direction of the host vehicle is changed to avoid a collision with an object, the time required for various processes until it is determined whether to change the traveling direction of the host vehicle is shorter than when the traveling direction of the host vehicle is changed in normal traveling such as a lane change.

However, while the information integrated by sensor fusion technology is more reliable, it is slower to complete the process than when an object is recognized based on the output result of the external sensor alone, which is problematic.

For example, as in the technique described in PTL 1, when the collision check of the target trajectory is performed based on the result of integrating the information of the plurality of external sensors, a time in the order of 100 milliseconds may be required for the adjustment of the sampling time and the delay time between the external sensors and a process of integrating the detection results of the plurality of external sensors after the adjustment.

Thus, in the technique described in PTL 1, when a new object different from the object (the object to be avoided) approaches the target trajectory after the object is detected by the external sensor and before the collision check is completed, and the avoidance operation along the target trajectory is executed, the new object and the host vehicle may come into contact with each other.

An object of the present invention is to provide an in-vehicle electronic control device capable of performing a process of integrating information of a plurality of external sensors and preventing contact between an object different from an object to be avoided and a host vehicle by an avoidance operation involving a change in the traveling direction of the host vehicle.

Solution to Problem

An in-vehicle electronic control device according to an aspect of the present invention includes a processing device that acquires object information of an object detected by each of a plurality of external sensors mounted on a host vehicle and executes an integration process to integrate a plurality of pieces of the object information acquired. The processing device recognizes a travelable area on a road surface around the host vehicle that the host vehicle enters, based on a result of the integration process, predicts whether the host vehicle and the object will collide, based on the object information, sets an avoidance target for avoiding a collision with the object predicted to collide when a collision between the host vehicle and the object is predicted, generates an avoidance route in the travelable area, the avoidance route leading to the avoidance target, sets an entering object detection area around the host vehicle to detect entry of the object, and detects the object having entered the entering object detection area based on the object information of the object before the integration process, the object having been detected by the plurality of external sensors, and determines whether to execute an avoidance operation along the avoidance route based on a result of the detection.

Advantageous Effects of Invention

According to the present invention, it is possible to provide an in-vehicle electronic control device capable of performing a process of integrating information of a plurality of external sensors and preventing contact between an object different from an object to be avoided and a host vehicle by an avoidance operation involving a change in the traveling direction of the host vehicle.

BRIEF DESCRIPTION OF DRAWINGS

FIG. 5 is a functional block diagram illustrating detailed functions of a sensor fusion processing unit illustrated in FIG. 4.

FIG. 7 is a functional block diagram illustrating detailed functions of an entering object detection area setting unit illustrated in FIG. 4.

FIG. 13 is a diagram illustrating an example of a flow of a setting process for an entering object detection area in FIG. 12.

DESCRIPTION OF EMBODIMENTS

Figure 1:
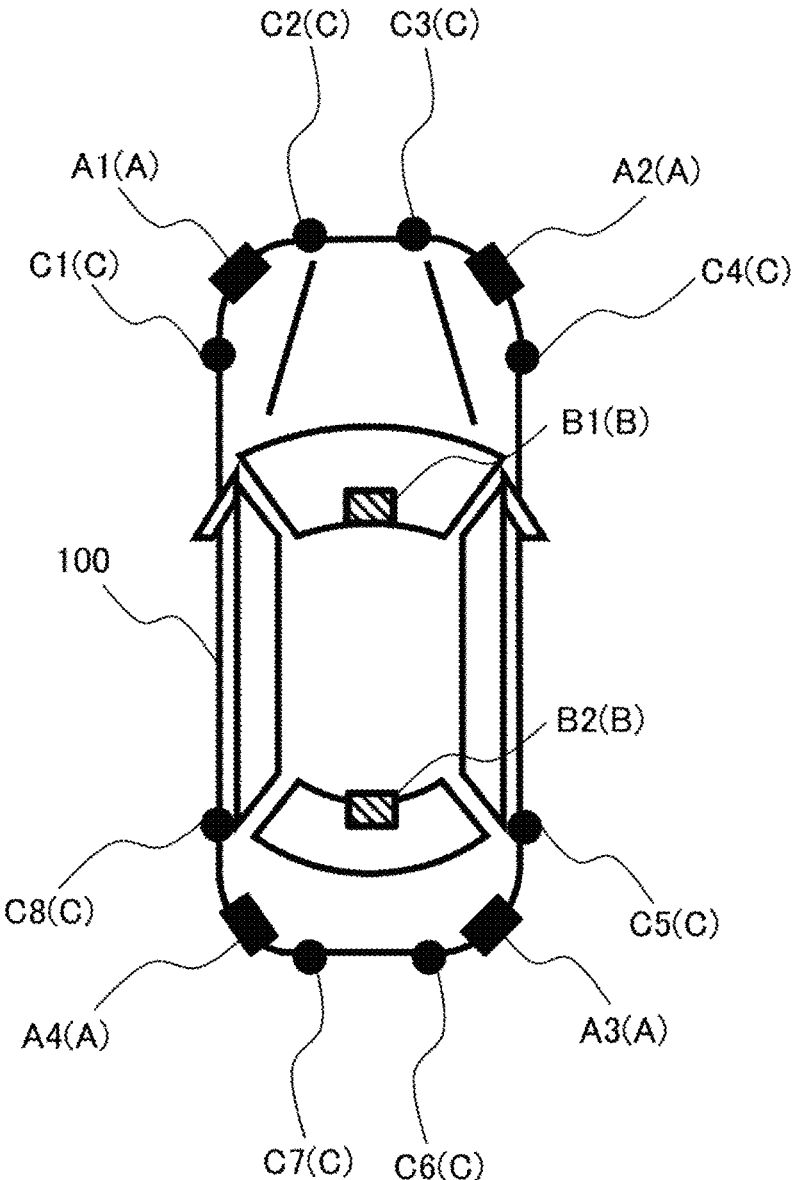
FIG. 1 is a plan view of a host vehicle, and illustrates a plurality of external sensors A, B, C installed on the host vehicle.

An in-vehicle electronic control device according to an embodiment of the present invention will be described below with reference to the drawings. In the drawings, elements to which the same numbers are assigned represent the same components, and redundant description will be omitted. Although an example in which the in-vehicle electronic control device according to the present embodiment is applied to a driving assistance system will be described, the in-vehicle electronic control device can also be applied to an automated driving system, and a similar effect can be obtained. Hereinafter, an automobile (a vehicle) in which the in-vehicle electronic control device according to the present embodiment is mounted is also referred to as a host vehicle.

In the present embodiment, by applying the in-vehicle electronic control device described below, it is possible to promptly detect a new object (an object different from an object to be avoided) approaching an avoidance route by an avoidance operation involving a change in the traveling direction of the host vehicle, based on object information acquired before an integration process for the object information, within the integration processing time until the integration process is completed, and it is possible to prevent contact between the host vehicle and the new object.

<External Sensor>

When a collision is predicted between the host vehicle and an object present in the traveling direction of the host vehicle, the in-vehicle electronic control device according to the present embodiment performs control to avoid the object predicted to collide by changing the traveling direction of the host vehicle. Therefore, an external sensor for detecting an object present in any direction around the host vehicle is provided on the host vehicle in preparation for movement not only in the front-rear direction but also in the lateral direction (left-right direction). The in-vehicle electronic control device is connected to an external sensor, and acquires object information of an object detected by the external sensor. Note that the object refers to, for example, another object excluding the host vehicle, pedestrians, bicycles, road signs, road markings, median strips, traffic lights, road boundaries, road edges, curbstones, obstacles, or the like. In addition, the object information includes information indicating the relative position and relative speed of the object with respect to the host vehicle, and the size such as the width of the object. Note that the relative position and the relative speed of the object with respect to the host vehicle may be calculated by the in-vehicle electronic control device based on information acquired from the external sensor.

A configuration example of a plurality of external sensors A, B, C (A1 to A4, B1, B2, C1 to C8) provided on a host vehicle 100 will be described with reference to FIG. 1. FIG. 1 is a plan view of the host vehicle 100, and illustrates the plurality of external sensors A, B, C installed on the host vehicle 100. As illustrated in FIG. 1, three types of external sensors A, B, C are installed on the host vehicle 100.

The external sensor A is a wide-angle sensor, and is, for example, a camera (monocular camera, stereo camera), a millimeter wave radar, or a laser radar. The wide-angle sensor performs monitoring within a distance range up to about several tens of meters surrounding the host vehicle 100. The wide-angle sensors attached to the host vehicle 100 include: an external sensor A1 that is installed on the front left part of the host vehicle 100 and monitors the front left of the host vehicle 100; an external sensor A2 that is installed on the front right part of the host vehicle 100 and monitors the front right of the host vehicle 100; an external sensor A3 that is installed on the rear right part of the host vehicle 100 and monitors the rear right of the host vehicle 100; and an external sensor A4 that is installed on the rear left part of the host vehicle 100 and monitors the rear left of the host vehicle 100.

The external sensor B is a long-range sensor, and is, for example, a camera (monocular camera, stereo camera), a millimeter wave radar, or a laser radar. The long-distance sensors attached to the host vehicle 100 include: an external sensor B1 that is installed on the upper part of the windshield and monitors the front of the host vehicle 100; and an external sensor B2 that is installed on the upper part of the rear window and monitors the rear of the host vehicle 100.

The external sensor C is a short-range sensor, for example, an ultrasonic sensor. The short-range sensor monitors a range close to the host vehicle 100 that is difficult to detect by the wide-angle sensor. The short-distance sensors attached to the host vehicle 100 include: an external sensor C1 that is installed on the front left part of the host vehicle 100 and monitors the front left of the vehicle 100; external sensors C2, C3 that are installed on the front side of the host vehicle 100 and monitors the front of the host vehicle 100; an external sensor C4 that is installed on the front right part of the host vehicle 100 and monitors the front right of the host vehicle 100; an external sensor C5 that is installed on the rear right part of the host vehicle 100 and monitors the rear right of the host vehicle 100; external sensors C6, C7 that are installed on the rear side of the host vehicle 100 and monitors the rear of the host vehicle 100, and an external sensor C8 that is installed on the rear left part of the host vehicle 100 and monitors the rear left of the host vehicle 100.

Figure 2:
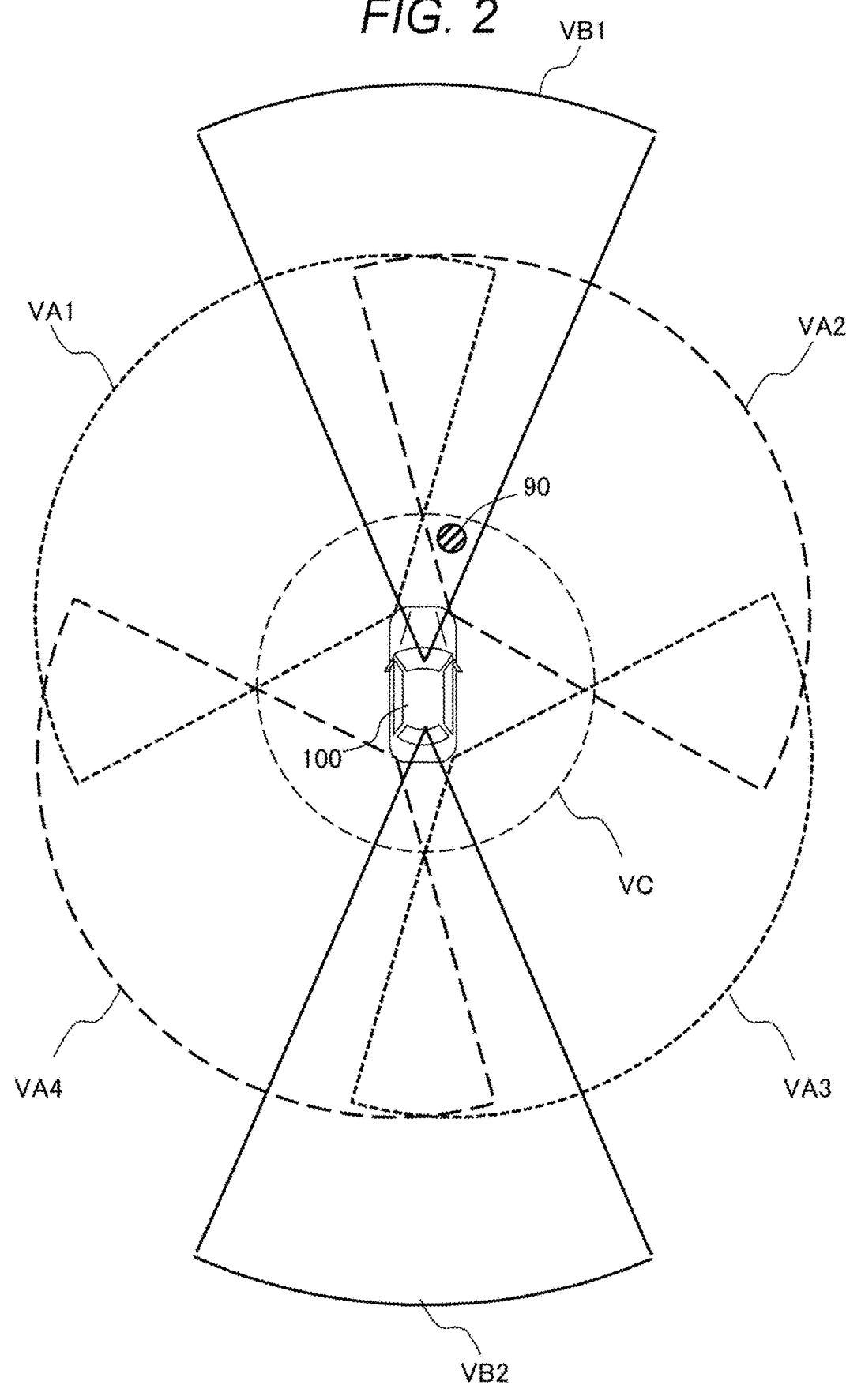
FIG. 2 is a plan view of the host vehicle, and illustrates an example of the viewing ranges of the external sensors A, B, C illustrated in FIG. 1.

FIG. 2 is a plan view of the host vehicle, and illustrates an example of the viewing ranges (detection ranges) of the external sensors A, B, C illustrated in FIG. 1. As illustrated in FIGS. 1 and 2, a viewing range VA1, a viewing range VA2, a viewing range VA3, and a viewing range VA4 represent ranges in which an object can be detected using external sensors A1, A2, A3, A4 that are wide-angle sensors, respectively. The viewing range VB1 and the viewing range VB2 represent ranges in which an object can be detected using the external sensors B1, B2 that are long-range sensors, respectively. The viewing range VC represents a range in which an object can be detected using the external sensors C1, C2, C3, C4, C5, C6, C7, C8.

The viewing angles of the external sensors A1 to A4 in the horizontal direction, that is, the central angles of the fan-shaped viewing ranges VA1 to VA4 illustrated, are larger than 90 degrees. In addition, the external sensors A1 to A4 are arranged so that adjacent viewing ranges partially overlap each other. This enables the external sensors A1 to A4 to monitor a 360θ range around the host vehicle 100 in a more distant area than the short-range sensors.

The external sensors C1 to C8 are arranged so that the viewing range VC that can cover an area not covered by any of the viewing ranges VA1 to VA4 is formed in an area near the host vehicle 100.

For directions along the traveling direction of the host vehicle 100, that is, the front and rear of the host vehicle 100, it is required to detect the presence of an object at an earlier stage. Therefore, the viewing ranges VB1, VB2 of the external sensors B1, B2 extend farther than the viewing ranges VA1 to VA4 of the wide-angle sensor.

<Hardware Configuration of In-Vehicle Electronic Control Device>

Figure 3:
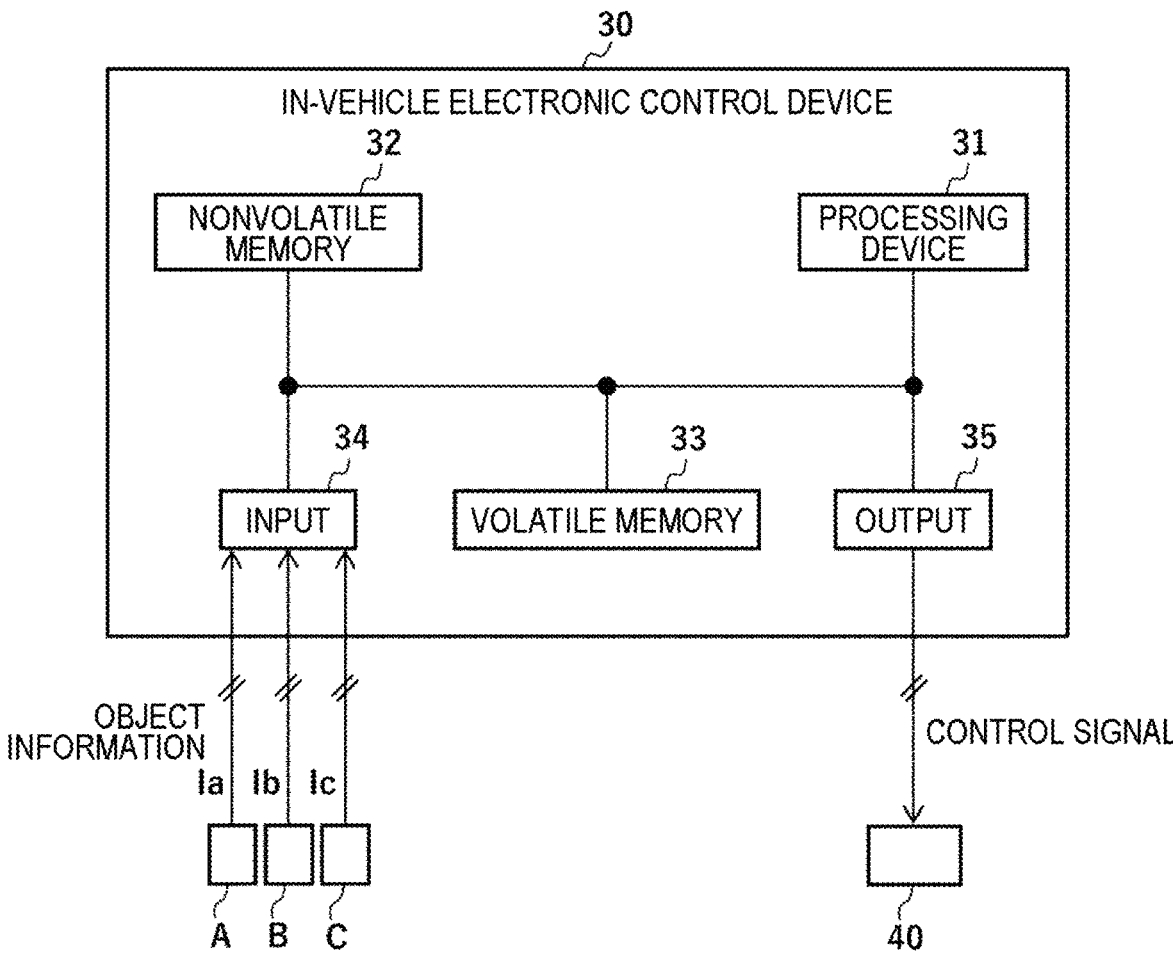
FIG. 3 is a diagram illustrating an example of a hardware configuration of an in-vehicle electronic control device according to the present embodiment.

FIG. 3 is a diagram illustrating an example of a hardware configuration of an in-vehicle electronic control device 30 according to the present embodiment. As illustrated in FIG. 3, the in-vehicle electronic control device 30 is configured by a computer including a processing device 31 such as a central processing unit (CPU), a micro processing unit (MPU), or a digital signal processor (DSP), a nonvolatile memory 32 such as a read-only memory (ROM), a flash memory, or a hard disk drive, a volatile memory 33 called a random-access memory (RAM), an input interface 34, an output interface 35, and other peripheral circuits. Note that an application-specific integrated circuit (ASIC), a field-programmable gate array (FPGA), or the like can also be used as the processing device 31. The nonvolatile memory 32 and the volatile memory 33 function as storage devices that store information (data).

The nonvolatile memory 32 stores a program capable of executing various operations. That is, the nonvolatile memory 32 is a storage device (storage medium) capable of reading a program for realizing the functions of the present embodiment. The processing device 31 is an arithmetic device that loads a program, stored in the nonvolatile memory 32, into the volatile memory 33 and executes calculations. According to the program, the processing device 31 performs predetermined arithmetic processing on data acquired from the input interface 34 as well as the nonvolatile memory 32 and the volatile memory 33 that are storage devices.

The input interface 34 converts object information (detection information) Ia, Ib, Ic detected by the external sensors A, B, C so that the object information can be calculated by the processing device 31. The output interface 35 generates a control signal according to a calculation result in the processing device 31 and outputs the control signal to a control target 40.

Note that the in-vehicle electronic control device 30 may be configured by a single computer or may be configured by a plurality of computers. When the in-vehicle electronic control device 30 is configured by a plurality of computers, the functions of the in-vehicle electronic control device 30 are implemented by a plurality of processing devices 31.

The processing device 31 of the in-vehicle electronic control device 30 acquires object information of an object detected by the plurality of external sensors A, B, C mounted on the host vehicle 100, stores the object information in the storage device, and executes an integration process to integrate the plurality of pieces of object information stored in the storage device.

In the integration process, for example, when the same object is detected by the plurality of types of external sensors A, B, C, the processing device 31 generates integrated information obtained by integrating the object information of the object detected by the plurality of types of external sensors A, B, C, and stores the integrated information in the storage device.

Based on a plurality of pieces of object information generated for one object. The processing device 31 generates integrated information including the position of the object. As illustrated in FIG. 2, an example of an object information integration process, when an object 90 present on the front right of the host vehicle 100 is detected by the external sensors A, B, C, will be described. The position of the object 90 detected by the external sensor A is defined as a position PA, the position of the object 90 detected by the external sensor B is defined as a position PB, and the position of the object 90 detected by the external sensor C is defined as a position PC. The processing device 31 assumes that an object having the same mass is present at the position PA, the position PB, and the position PC, and calculates the barycentric positions thereof as integrated information. Note that the mass of the object assumed at each of the positions PA, PB, PC may be increased in proportion to the higher reliability of the external sensors A, B, C.

<Functions of In-Vehicle Electronic Control Device>

Figure 4:
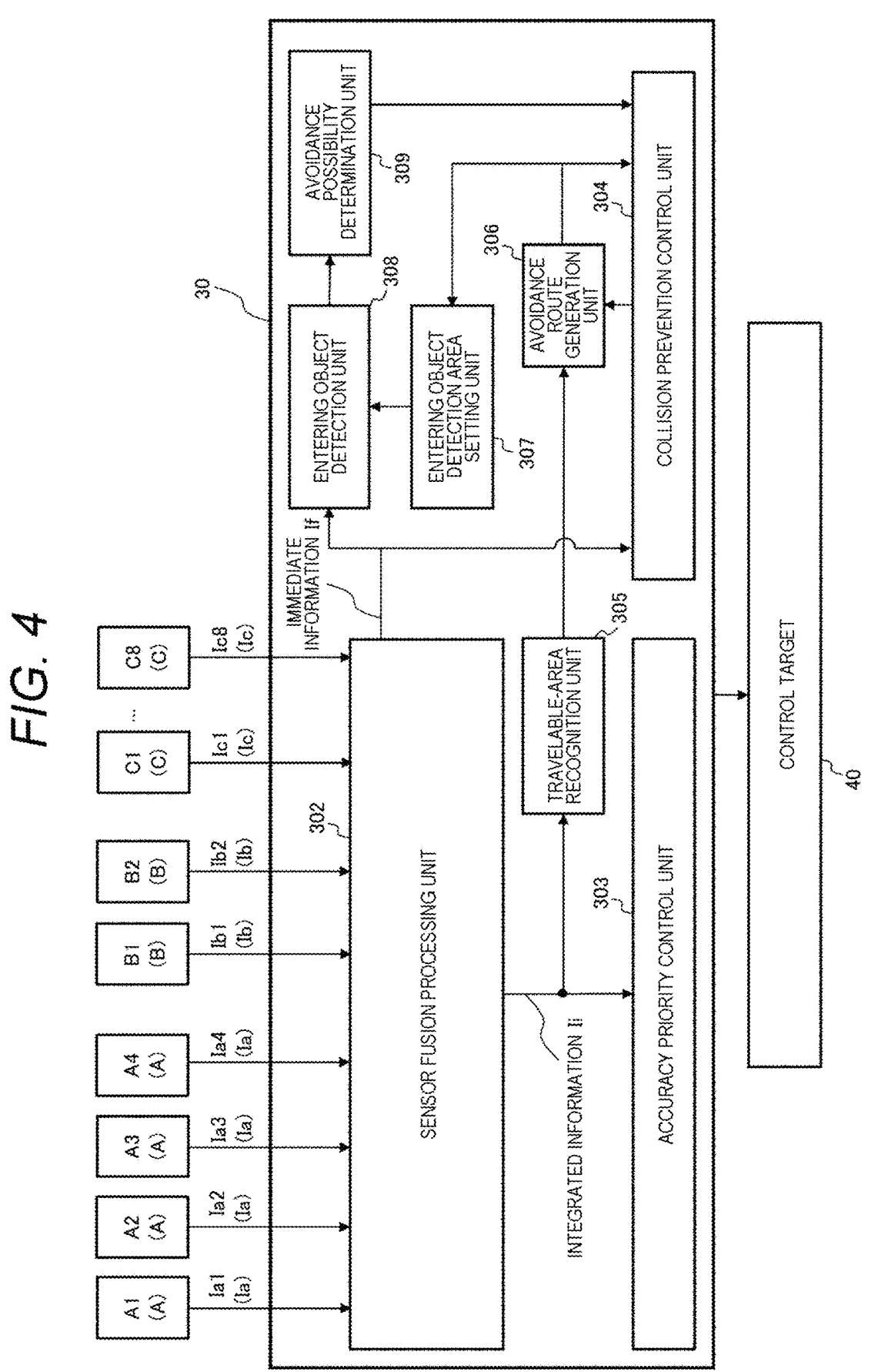
FIG. 4 is a functional block diagram of the in-vehicle electronic control device.

The functions of the in-vehicle electronic control device 30 according to the present embodiment will be described in detail with reference to FIGS. 4 to 10. FIG. 4 is a functional block diagram of the in-vehicle electronic control device 30.

As illustrated in FIG. 4, the plurality of external sensors A1 to A4, B1, B2, C1 to C8 and the control target 40 are connected to the in-vehicle electronic control device 30. The in-vehicle electronic control device 30 acquires object information (detection information) Ia1 to Ia4, Ib1, Ib2, Ic1 to Ic8 of the object detected by the plurality of external sensors A1 to A4, B1, B2, C1 to C8, grasps the situation of the external world, and executes driving assistance control for operating the control target 40 according to the result. The control target 40 is a device or a system mounted in the host vehicle

100, and is a control target that operates to assist the driver based on a control signal output from the in-vehicle electronic control device 30.

For example, when the driving assistance control to be executed is lane deviation prevention control for preventing deviation from a lane currently being traveled, a steering device that steers the host vehicle 100 is the control target 40. When the driving assistance control to be executed is alert control for issuing an alarm to notify the driver of the possibility of a collision with an object, a display device such as a liquid crystal monitor or a sound output device such as a speaker is the control target 40. When the driving assistance control to be executed is deceleration stop control for preventing a collision with an object, a brake device that applies braking force to the host vehicle 100 is the control target 40. When the driving assistance control to be executed is avoidance control for changing the traveling direction of the host vehicle 100 to avoid a collision with an object, the steering device is the control target 40.

Note that the in-vehicle electronic control device 30 may execute the plurality of driving assistance controls described above in combination. For example, the in-vehicle electronic control device 30 may simultaneously execute the avoidance control and the deceleration stop control. In this case, the operations of the steering device and the brake device, which are the control targets 40, are controlled by the control signal (operation command) output from the in-vehicle electronic control device 30. Since the avoidance control and the deceleration stop control are controls for preventing a collision between the host vehicle 100 and an object, hereinafter, both controls are also referred to collectively as collision prevention control in the following.

The in-vehicle electronic control device 30 functions as a sensor fusion processing unit 302, an accuracy priority control unit 303, a collision prevention control unit 304, a travelable-area recognition unit 305, an avoidance route generation unit 306, an entering object detection area setting unit 307, an entering object detection unit 308, and an avoidance possibility determination unit 309 by the processing device 31 executing a program stored in the nonvolatile memory 32.

The sensor fusion processing unit 302 executes a sensor fusion process, based on the object information Ia, Ib, Ic acquired from the plurality of external sensors A, B, C. The sensor fusion process includes the integration process to integrate object information Ia, Ib, Ic acquired from the plurality of external sensors A, B, C to generate integrated information Ii. The sensor fusion processing unit 302 generates integrated information Ii with higher accuracy than information detected by the external sensors alone in the entire field of view of the plurality of external sensors A, B, C.

The accuracy priority control unit 303 performs driving assistance control such as adaptive cruise control (ACC) and lane keeping (lane keeping). Driving assistance control such as ACC and lane keeping is intended to improve comfort and convenience during steady driving, and the control with high accuracy is required to ensure stable operation. Therefore, the accuracy priority control unit 303 executes driving assistance control, such as ACC and lane keeping, based on the integrated information Ii generated by the sensor fusion processing unit 302 instead of the information detected by the external sensor alone.

On the other hand, when detecting an object that may cause a collision in the traveling direction of the host vehicle 100, the collision prevention control unit 304 outputs a control signal to the brake device or the steering device to prevent the collision. It is desirable that the collision prevention control unit 304 promptly output a control signal to control target 40 to prevent a collision with the detected object.

Here, between collision prevention control based on the integrated information Ii and collision prevention control based on the information detected by the external sensor alone without performing the integration process, the latter is more excellent in control responsiveness. In the sensor fusion process by the sensor fusion processing unit 302, as will be described later, a relatively large delay occurs in the course of the process.

Figure 5:
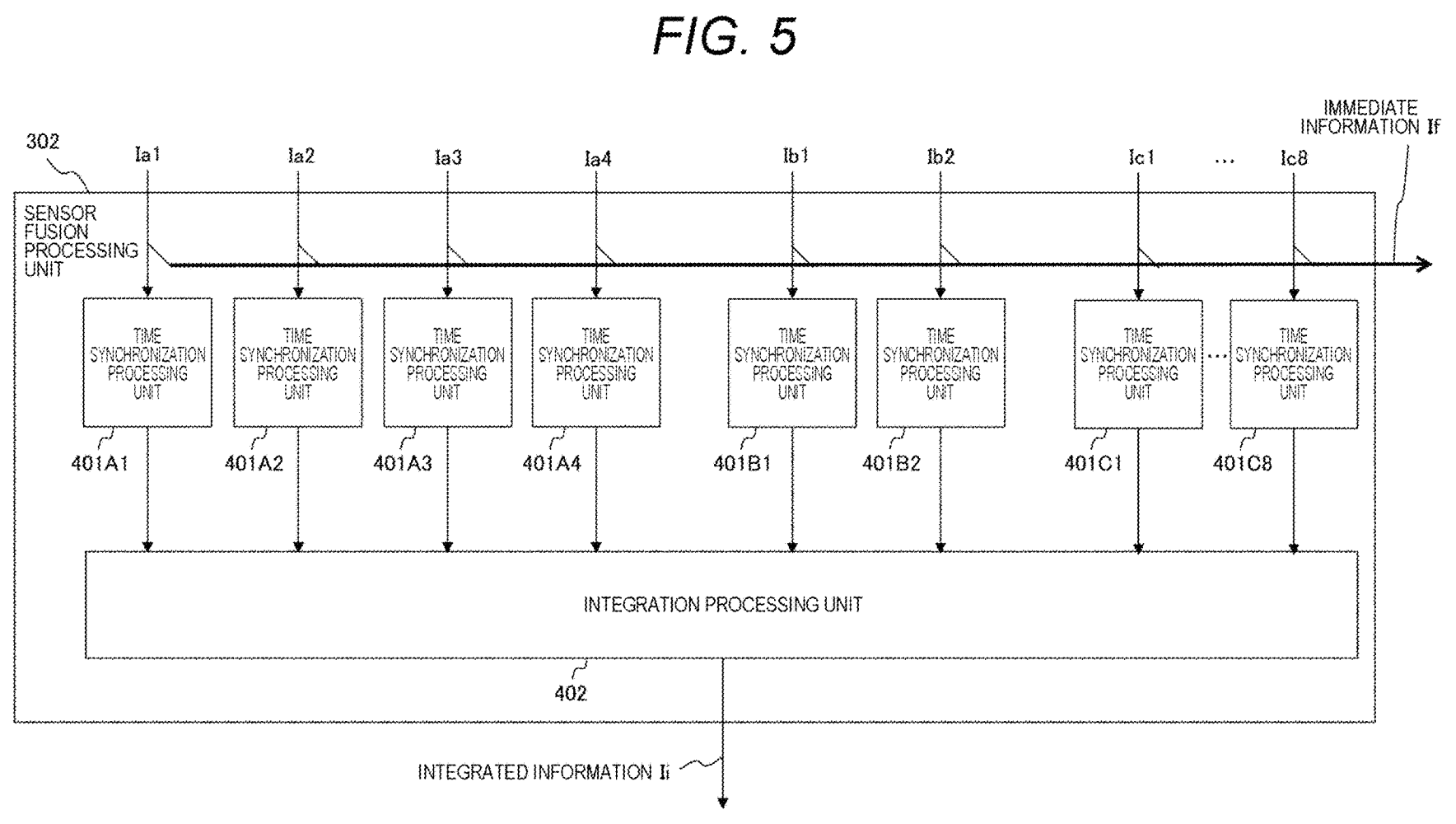

The sensor fusion process by the sensor fusion processing unit 302 and the amount of delay in the sensor fusion process will be described in detail with reference to FIG. 5. FIG. 5 is a functional block diagram illustrating detailed functions of the sensor fusion processing unit illustrated in FIG. 4.

As illustrated in FIG. 5, the sensor fusion processing unit 302 includes: time synchronization processing units 401A1 to 401A4, 401B1, 401B2, 401C1 to 401C8 corresponding to object information Ia1 to Ia4, Ib1, Ib2, Ic1 to Ic8 from the plurality of external sensors A1 to A4, B1, B2, C1 to C8; and an integration processing unit 402 that integrates the plurality of pieces of object information Ia1 to Ia4, Ib1, Ib2, Ic1 to Ic8 to generate the integrated information Ii.

The plurality of external sensors A1 to A4, B1, B2, C1 to C8 differ from each other in sampling time (sampling timing) and data transmission delay time. Therefore, the time synchronization processing units 401A1 to 401C8 execute the time synchronization process on the object information Ia1 to Ia4, Ib1, Ib2, Ic1 to Ic8 from the external sensors A1 to A4, B1, B2, C1 to C8 prior to the integration process by the integration processing unit 402.

Based on the object information Ia1 to Ia4, Ib1, Ib2, Ic1 to Ic8, the time synchronization processing units 401A1 to 401C8 generate the estimated data strings of the object information Ia1 to Ia4, Ib1, Ib2, Ic1 to Ic8, obtained by sampling at the common timing. The generation of the estimated data string can be realized by interpolating sample values, taken at times that sandwich the assumed sampling time, among the sample values for each object information. However, in the process of obtaining the estimated value at the common timing by interpolation, the amount of delay equal to or more than the largest amount of delay among the object information Ia1 to Ia4, Ib1, Ib2, Ic1 to Ic8 is added to the estimated data string.

Based on the estimated data string of the object information synchronized by each of the time synchronization processing units 401A1 to 401C8, the integration processing unit 402 performs the integration process on the object information. The integrated information Ii generated by the integration process has higher reliability than the object information of the object detected by the external sensor alone. However, for the integrated information Ii, in addition to the amount of delay resulting from the process by each of the time synchronization processing units 401A1 to 401C8, the amount of delay is increased by the processing time of the integration processing unit 402. Therefore, a time in the order of 100 milliseconds may be required until the integrated information Ii is generated from the timing at which the object is first detected by any of the plurality of external sensors A1 to A4, B1, B2, C1 to C8.

Therefore, in the present embodiment, the sensor fusion processing unit 302 outputs not only the integrated information Ii but also the object information of the object detected by the external sensors A, B, C at a stage before the integration process is executed as immediate information If.

The immediate information If is information with a shorter delay than the integrated information Ii, and is used for collision prevention control.

Note that the immediate information If may be subjected to a filter process, a correction process, or the like on the object information Ia, Ib, Ic detected by the external sensors A, B, C. The filter process is a process of reducing the influence of noise and abnormal values on the object information Ia, Ib, Ic. The correction process is a process of correcting system errors (individual differences of the external sensors) with respect to the object information Ia, Ib, Ic.

When the processing times for the filter process and the correction process are sufficiently shorter than the processing times for the time synchronization process and the integration process, the sensor fusion processing unit 302 may use the object information after the execution of the filter process and the correction process as the immediate information If.

Thus, the immediate information If may be the object information Ia, Ib, Ic themselves detected by the external sensors A, B, C, object information subjected to the filter process, or object information subjected to the correction process. In other words, the immediate information If may be at least object information at a stage before the time synchronization process and the integration process.

Figure 6:
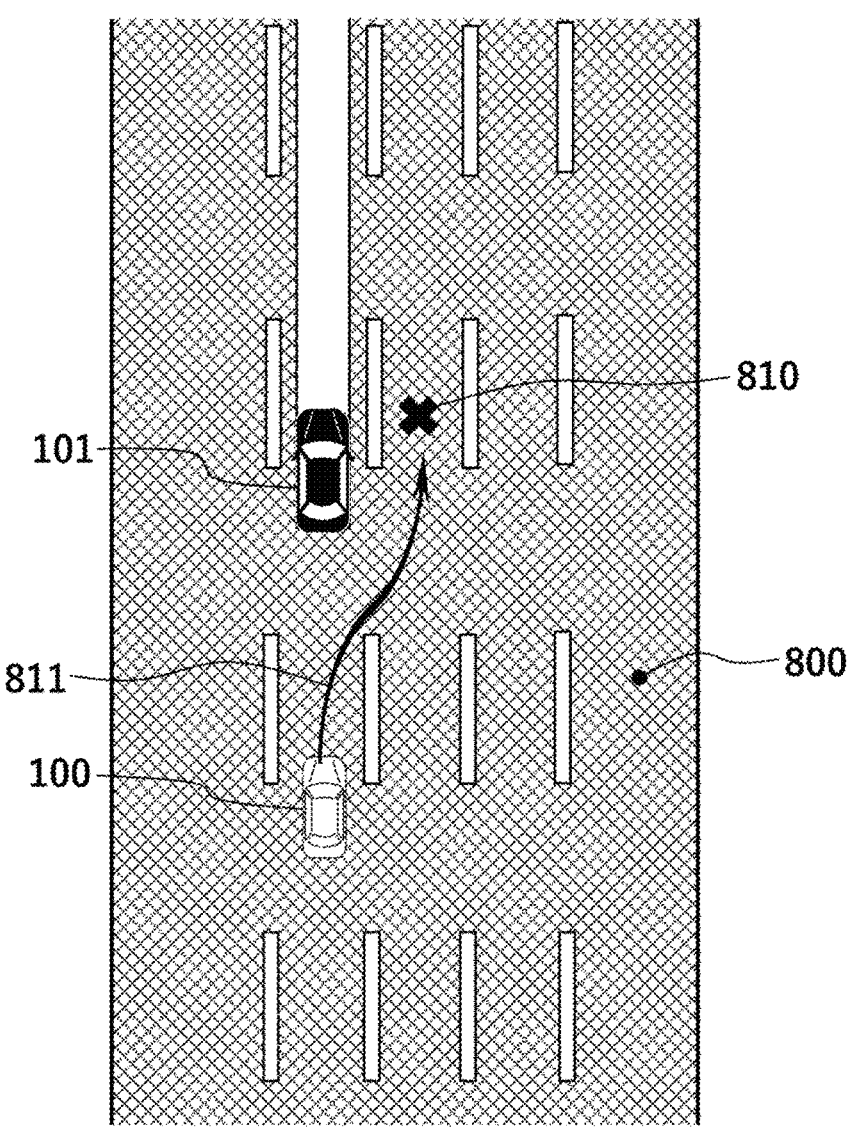
FIG. 6 is a schematic plan view of a road on which a host vehicle travels, and illustrates the host vehicle, another vehicle present in front of the host vehicle, and a travelable area.

Based on the integrated information Ii, the travelable-area recognition unit 305 illustrated in FIG. 4 recognizes a travelable area 800 (cf. FIG. 6) on the road surface around the host vehicle 100, where there is no object (obstacle) and the host vehicle 100 can enter. FIG. 6 is a schematic plan view of a road on which the host vehicle 100 travels, and illustrates the host vehicle 100, another vehicle 101 present in front of the host vehicle 100, and the travelable area 800. In FIG. 6, the travelable area 800 is schematically indicated by grid-like hatching. In the recognition process for the travelable area 800, a wide range of 360° around the host vehicle 100, which is difficult to cover by the external sensor alone, is set as a processing target.

The travelable-area recognition unit 305 calculates a distribution of a free space based on the integrated information Ii generated as a result of the integration process by the sensor fusion processing unit 302. The free space refers to a space in which no vehicle, obstacle, or the like is present. The travelable-area recognition unit 305 recognizes the travelable area 800 based on the distribution of the free space. When the free space is larger than the size of the host vehicle 100, the free space is recognized as the travelable area 800. In other words, when the free space is smaller than the size of the host vehicle 100, the free space is not recognized as the travelable area 800.

Based on the immediate information If that is object information of an object, detected by the plurality of external sensors A, B, C, before the integration process, the collision prevention control unit 304 illustrated in FIG. 4 predicts whether the host vehicle 100 will collide with the object. The collision prevention control unit 304 predicts whether the host vehicle 100 and the object will collide based on the relative speed and the relative distance between the host vehicle 100 and the object, included in the immediate information If. In this collision prediction, the collision prevention control unit 304 predicts whether the host vehicle 100 and the object will collide assuming that the host vehicle 100 maintains its current speed. Hereinafter, this collision prediction is also referred to as a first collision prediction.

When a collision is predicted between the host vehicle 100 and the object (e.g., another vehicle 101 that is present in front of the host vehicle 100 and has stopped by sudden braking, illustrated in FIG. 6), the collision prevention control unit 304 controls the brake device to perform braking by the braking device. The collision prevention control unit 304 predicts whether the host vehicle 100 will collide with the object (hereinafter also referred to as the target object), predicted to collide with the host vehicle 100 in the first collision prediction, by braking by the brake device. Hereinafter, this collision prediction is also referred to as a second collision prediction.

In the second collision prediction by the collision prevention control unit 304, when a collision is predicted between the host vehicle 100 and the target object, the avoidance route generation unit 306 generates an avoidance route 811 (cf. FIG. 6), which is a traveling route for avoiding the target object.

The avoidance route generation unit 306 sets an avoidance target 810 for the host vehicle 100 to avoid a collision with the target object in the travelable area 800 recognized by the travelable-area recognition unit 305. Furthermore, the avoidance route generation unit 306 generates the avoidance route 811, which leads to the avoidance target 810, in the travelable area 800.

In the present embodiment, a lane adjacent to the lane on which the host vehicle 100 travels is a part of the travelable area 800. Therefore, the avoidance route generation unit 306 sets the avoidance target 810 in a lane adjacent to the lane in which the host vehicle 100 travels, that is, outside the lane in which the host vehicle 100 travels.

The number of avoidance routes generated by the avoidance route generation unit 306 may be single or multiple. Note that the avoidance route generation unit 306 does not generate the avoidance route when a sufficient travelable area is not present. An example in which a single avoidance route is generated will be described. The avoidance target 810 is a target point at which the host vehicle 100 stops after avoiding the target object when the deceleration stop control is executed, and is a target point at which the host vehicle 100 stably travels straight after avoiding the target object when the deceleration stop control is not executed.

When the host vehicle 100 is caused to travel along the avoidance route 811 to avoid a collision with the target object, the front of the target object tends to become a blind spot before and after the traveling direction of the host vehicle 100 changes. To reduce the risk of a collision with the object from within this blind spot, it is preferable to execute deceleration stop control and stop the host vehicle 100 at the avoidance target 810.

The travelable area 800 recognized by the travelable-area recognition unit 305 is information of an older time by the time required for the process by the sensor fusion processing unit 302 and the process by the travelable-area recognition unit 305. Thus, at the current time, an object may be present in the travelable area 800 and the host vehicle 100 may not actually be able to enter the travelable area 800, that is, the travelable area 800 may be in an invalid state. In this case, when the host vehicle 100 is caused to travel along the avoidance route 811 generated in the travelable area 800, a new object that has entered the periphery of the avoidance route 811 may come into contact with the host vehicle 100.

Therefore, the in-vehicle electronic control device 30 according to the present embodiment determines a limited area including the avoidance route 811 as an entering object detection area Ad (cf. FIGS. 9 and 10), and determines whether a new entering object has been detected in the entering object detection area Ad, based on the immediate information If with a small delay generated by the process at the preceding stage of the integration process. Based on the determination result, the in-vehicle electronic control device 30 determines whether the travelable area 800 is still in a valid state at the current time, that is, whether the host vehicle 100 can enter at the current time. Details will be described below.

The entering object detection area setting unit 307 sets an entering object detection area Ad (cf. FIGS. 9 and 10) for detecting the entry of an object around the host vehicle 100. In the present embodiment, the entering object detection area setting unit 307 sets a plurality of detection area candidates Ca (cf. FIG. 8) along the traveling direction of the host vehicle 100. The entering object detection area setting unit 307 selects the detection area candidate Ca to be the entering object detection area Ad from among the plurality of detection area candidates Ca, based on the relationship between the traveling direction of the lane in which the avoidance target 810 is set and the traveling direction of the host vehicle 100.

Figure 7:
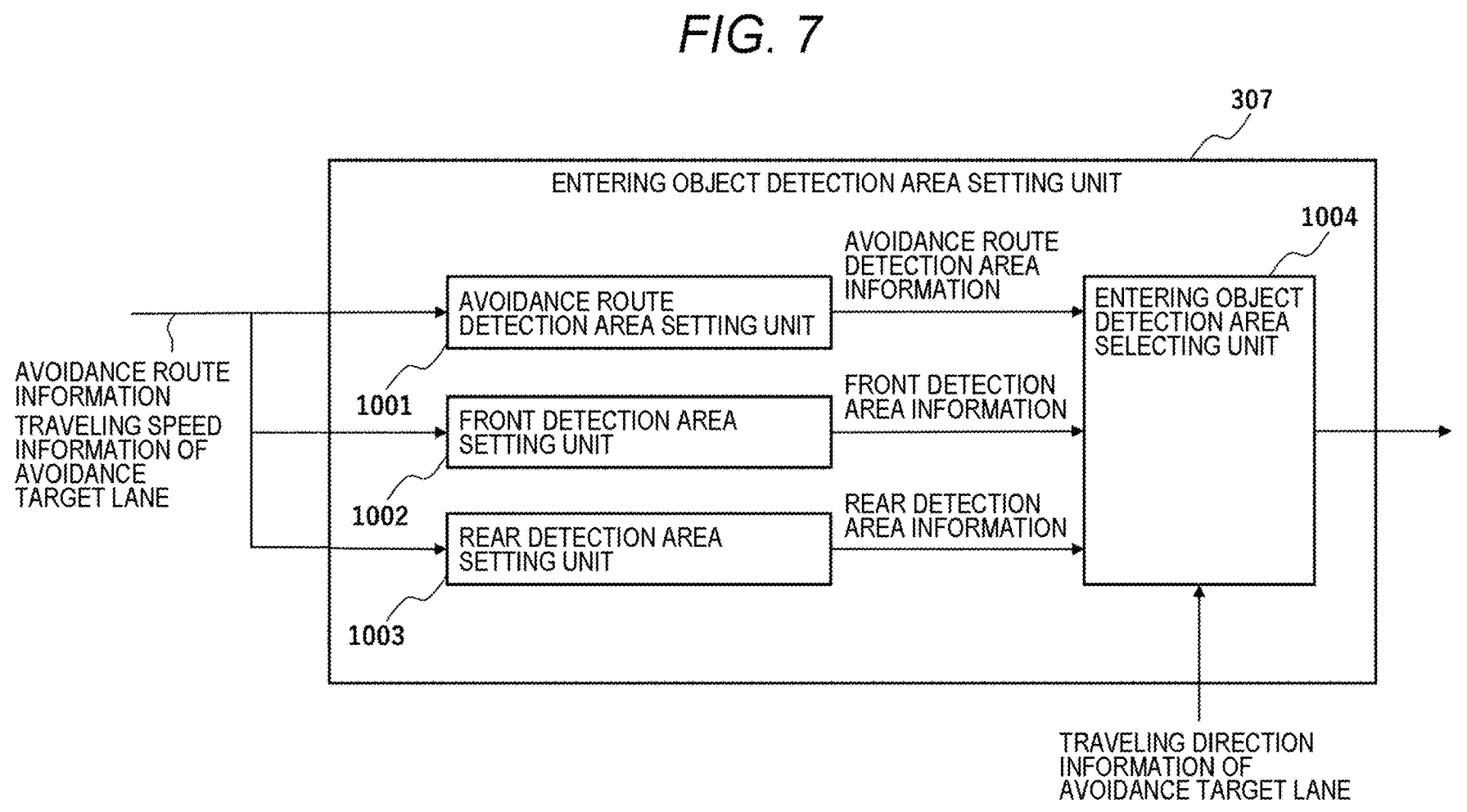
Figure 8:
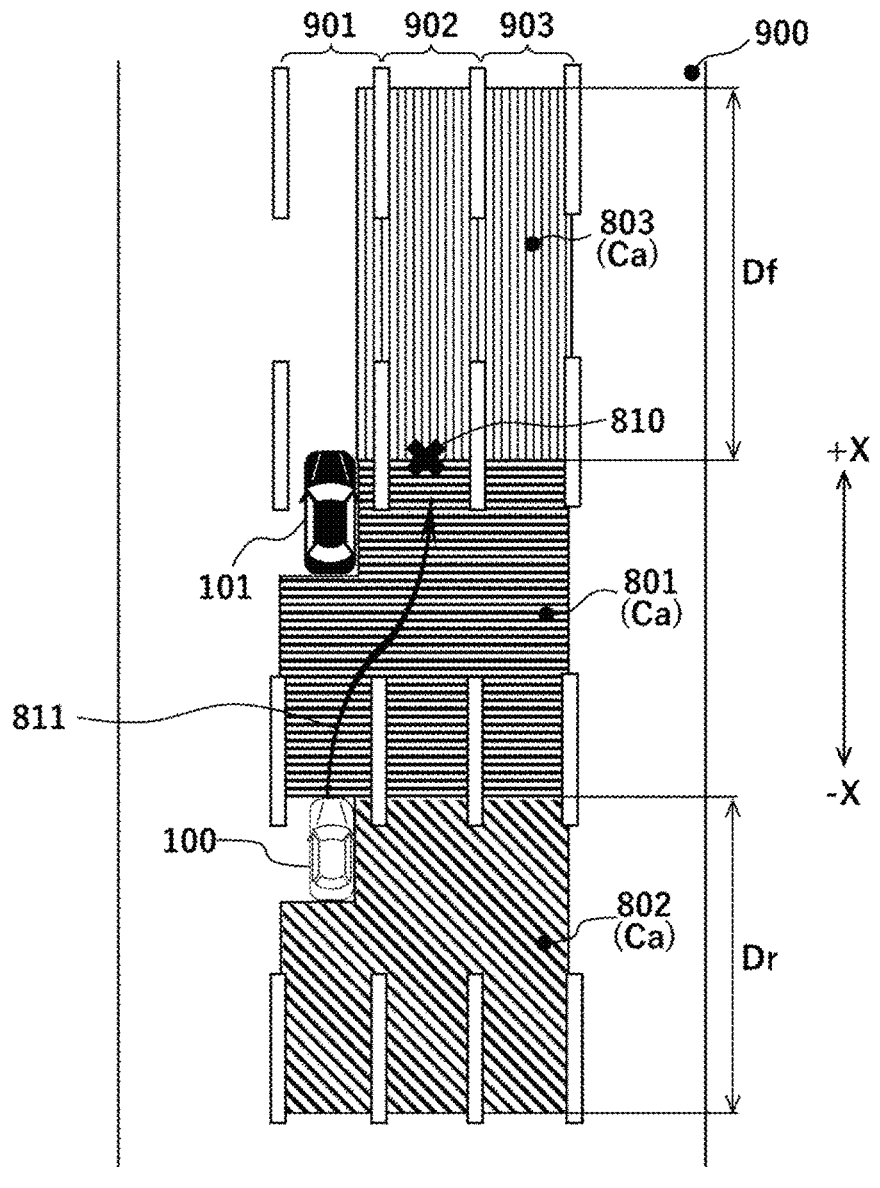
FIG. 8 is a schematic plan view of a road on which the host vehicle travels, and illustrates a plurality of detection area candidates set by an entering object detection area setting unit.

A setting process for the entering object detection area Ad by the entering object detection area setting unit 307 will be described in detail with reference to FIGS. 7 to 10. FIG. 7 is a functional block diagram illustrating detailed functions of the entering object detection area setting unit 307 illustrated in FIG. 4. FIG. 8 is a schematic plan view of a road 900 on which the host vehicle 100 travels, and illustrates a plurality of detection area candidates Ca set by the entering object detection area setting unit 307. The example in FIG. 8 illustrates the detection area candidate Ca when the host vehicle 100 is predicted to collide with another vehicle 101 in front of the host vehicle 100. In the present embodiment, each of the detection area candidates Ca has a rectangular shape.

As illustrated in FIG. 7, the entering object detection area setting unit 307 includes an avoidance route detection area setting unit 1001, a front detection area setting unit 1002, a rear detection area setting unit 1003, and an entering object detection area selection unit 1004.

As illustrated in FIGS. 7 and 8, the avoidance route detection area setting unit 1001 sets an avoidance route detection area 801 as one of the detection area candidates Ca. The avoidance route detection area 801 is set to include the avoidance route 811 generated by the avoidance route generation unit 306. The avoidance route detection area 801 is set to a lane (hereinafter also referred to as a host vehicle traveling lane) 901 on which the host vehicle 100 is traveling, a lane (hereinafter also referred to as an avoidance target lane) 902 where the avoidance target 810 is set, and a lane (hereinafter also referred to as an avoidance-destination adjacent lane) 903 on the opposite side of the host vehicle traveling lane 901 among lanes adjacent to the avoidance target lane 902.

The left end of the avoidance route detection area 801 is set to the left end of the host vehicle traveling lane 901, and the right end of the avoidance route detection area 801 is set to the right end of the avoidance-destination adjacent lane 903. The width of the avoidance route detection area 801 corresponds to the width of three lanes.

The rear end of the avoidance route detection area 801 is set to the front end of the host vehicle 100 (i.e., the start point of the avoidance route 811), and the front end of the avoidance route detection area 801 is set to the avoidance target 810 (i.e., the end point of the avoidance route 811). Therefore, the length of the avoidance route detection area 801 corresponds to the length of the road 900 from the front end of the host vehicle 100 to the avoidance target 810.

The front detection area setting unit 1002 sets a front detection area 803 as one of the detection area candidates Ca. The front detection area 803 is set in front of the avoidance route detection area 801. The front detection area 803 is an area extending forward from the avoidance target 810. The front detection area 803 is set to the host vehicle traveling lane 901, the avoidance target lane 902, and the avoidance-destination adjacent lane 903.

The left end of the front detection area 803 is set to the right side of another vehicle 101, and the right end of the front detection area 803 is set to the right end of the avoidance-destination adjacent lane 903. The width of the front detection area 803 corresponds to a value obtained by adding the horizontal distance between the right end of the host vehicle traveling lane 901 and the right side of another vehicle 101 to the width of two lanes.

The rear end of the front detection area 803 is set as the avoidance target 810, and the front end of the front detection area 803 is set at a position away forward from the avoidance target 810 by a predetermined distance Df. The predetermined distance Df will be described later.

The rear detection area setting unit 1003 sets a rear detection area 802 as one of the detection area candidates Ca. The rear detection area 802 is set behind the avoidance route detection area 801. The rear detection area 802 is an area extending rearward from the front end of the host vehicle 100.

The left end of the rear detection area 802 is set to the left end of the host vehicle traveling lane 901, and the right end of the rear detection area 802 is set to the right end of the avoidance-destination adjacent lane 903. The width of the rear detection area 802 corresponds to the width of three lanes.

The front end of the rear detection area 802 is set at the front end of the host vehicle 100, and the rear end of the rear detection area 802 is set at a position separated rearward from the front end of the host vehicle 100 by a predetermined distance Dr. The predetermined distance Dr will be described later.

Note that the avoidance route detection area 801 and the front detection area 803 are not set in front of the rear end of another vehicle 101 or to the left of the right side of another vehicle 101 in the host vehicle traveling lane 901. The rear detection area 802 is not set in front of the rear end of the host vehicle 100 or to the left of the right side of the host vehicle 100 in the host vehicle traveling lane 901.

The position, size, and shape of the avoidance route detection area 801 are specified by coordinates of a vehicle body reference coordinate system. The coordinates of the vehicle body reference coordinate system that specifies the position, size, and shape of the avoidance route detection area 801 are stored in the storage device as avoidance route detection area information.

The position, size, and shape of the front detection area 803 are specified by the coordinates of the vehicle body reference coordinate system. The coordinates of the vehicle body reference coordinate system that specifies the position, size, and shape of the front detection area 803 are stored in the storage device as front detection area information.

The position, size, and shape of the rear detection area 802 are specified by the coordinates of the vehicle body reference coordinate system. The coordinates of the vehicle body reference coordinate system that specifies the position, size, and shape of the rear detection area 802 are stored in the storage device as rear detection area information.

The entering object detection area selection unit 1004 selects the detection area candidate Ca to be the entering object detection area Ad from among the plurality of detection area candidates Ca, based on the relationship between the traveling direction of the avoidance target lane 902 and the traveling direction of the host vehicle 100 (the traveling direction of the host vehicle traveling lane 901).

The entering object detection area selection unit 1004 specifies the traveling direction of the avoidance target lane 902 and determines whether the traveling direction of the avoidance target lane 902 is the same as the traveling direction of the host vehicle 100 (i.e., the traveling direction of the host vehicle traveling lane 901). The entering object detection area selection unit 1004 specifies the traveling direction (forward or backward) of the host vehicle 100 based on traveling speed information of the host vehicle 100 that can be acquired from a wheel speed sensor or the like. In addition, the entering object detection area selection unit 1004 specifies the traveling direction of the avoidance target lane 902 based on the traveling direction information of the avoidance target lane 902. The traveling direction information of the avoidance target lane 902 is, for example, information regarding road signs and road markings detected by the external sensors A, B, C.

Note that the entering object detection area selection unit 1004 may specify the traveling direction of the host vehicle 100 and the traveling direction of the avoidance target lane 902 based on information from a host vehicle position detection device (not illustrated), and determine whether the traveling direction of the avoidance target lane 902 is the same as the traveling direction of the host vehicle 100. The host vehicle position detection device has a map transmission function and a locator function.

The map transmission function is a function of transmitting information, such as a road shape, the number of lanes, a traveling direction of each lane, and the maximum speed (speed limit) of the road, as map information. Note that the map information may be simple map information for navigation, or may be highly accurate map information having highly accurate information at the lane level.

The locator function is a function of acquiring vehicle position information using a positioning device including a global navigation satellite system (GNSS) antenna attached to the vehicle 100. The host vehicle position information includes position coordinates of the host vehicle 100 in a global coordinate system, which is the position information of the host vehicle 100, and the azimuth of the host vehicle 100, which is the posture information of the host vehicle 100.

Figure 9:
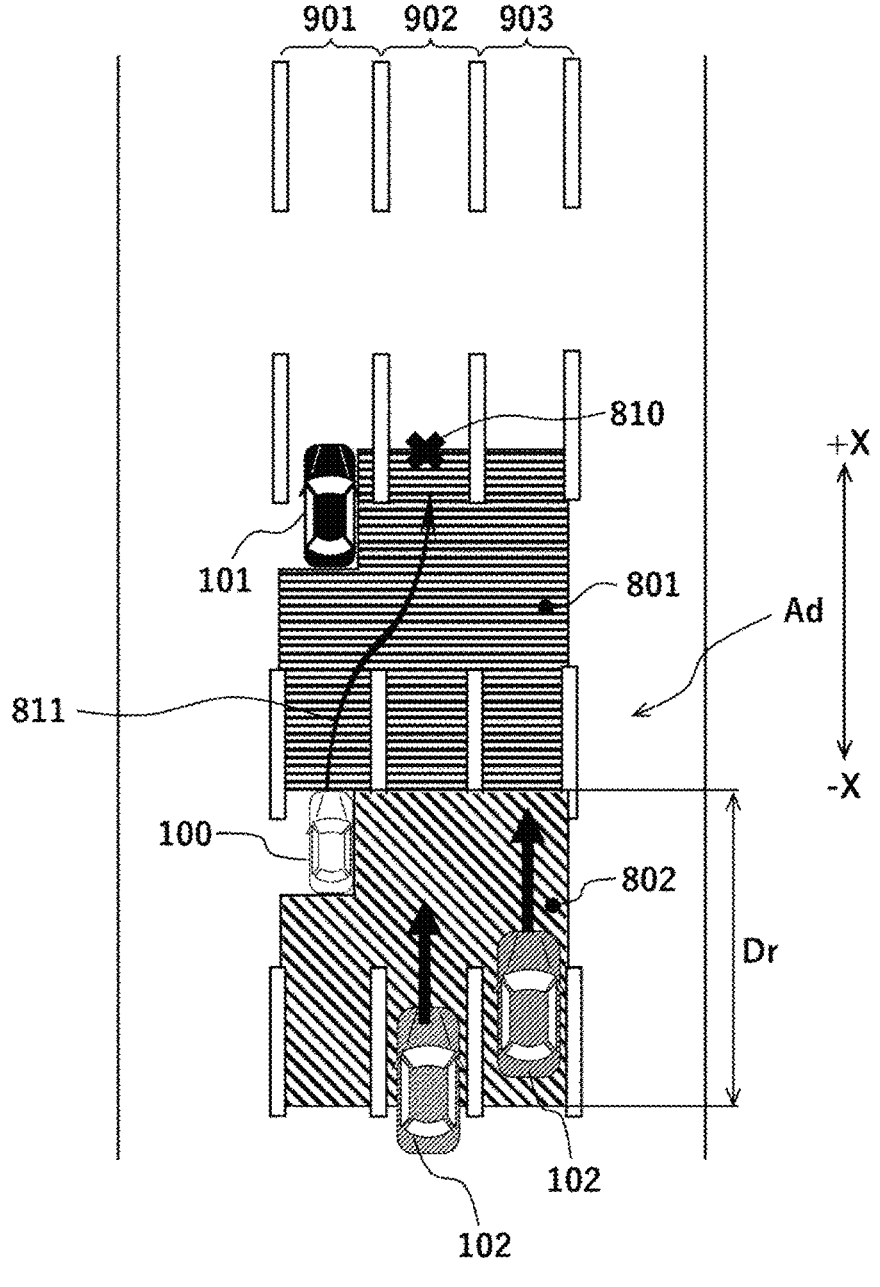
FIG. 9 is a diagram illustrating a road in which traveling directions of an avoidance target lane and an avoidance-destination adjacent lane are the same as a traveling direction of a host vehicle traveling lane.
Figure 10:
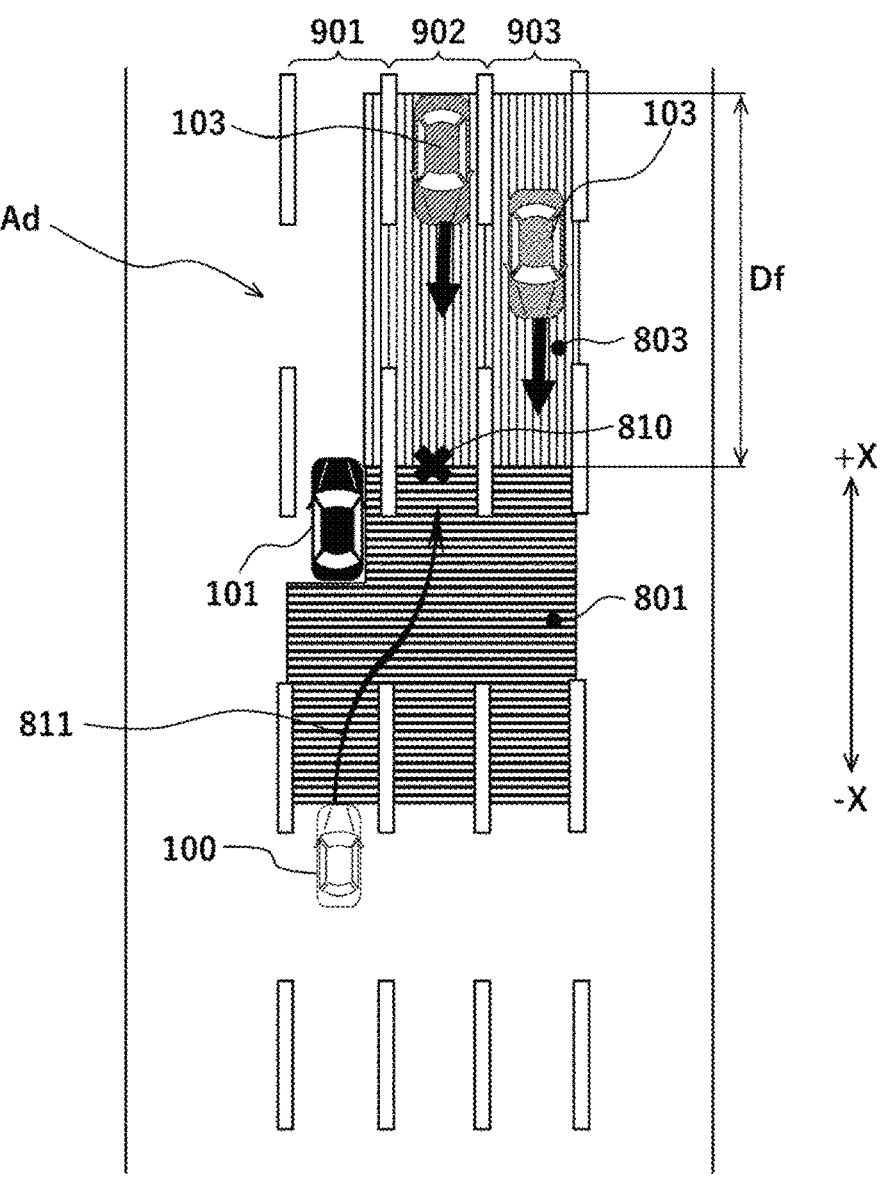
FIG. 10 is a view illustrating a road in which a traveling direction of an avoidance target lane and an avoidance-destination adjacent lane is opposite to a traveling direction of the host vehicle traveling lane.

FIG. 9 is a diagram illustrating a road in which the traveling directions of the avoidance target lane 902 and the avoidance-destination adjacent lane 903 are the same as the traveling direction of the host vehicle traveling lane 901. FIG. 10 is a diagram illustrating a road in which the traveling directions of the avoidance target lane 902 and the avoidance-destination adjacent lane 903 are opposite to the traveling direction of the host vehicle traveling lane 901.

As illustrated in FIG. 9, when the traveling direction of the host vehicle 100 is the +X direction and the traveling direction of the avoidance target lane 902 is the +X direction, it is not expected that an object that may collide with the host vehicle 100 approaches from an area in front of the avoidance target 810. Therefore, when the traveling direction of the avoidance target lane 902 is the same as the traveling direction of the host vehicle 100, the entering object detection area selection unit 1004 selects the avoidance route detection area 801 and the rear detection area 802 from among the plurality of detection area candidates Ca as the entering object detection area Ad. In this case, the entering object detection area selection unit 1004 does not select the front detection area 803 as the entering object detection area Ad.

As illustrated in FIG. 10, when the traveling direction of the host vehicle 100 is the +X direction and the traveling direction of the avoidance target lane 902 is the −X direction, it is not expected that an object that may collide with the host vehicle 100 approaches from an area behind the host vehicle 100. Therefore, when the traveling direction of the avoidance target lane 902 is opposite to the traveling direction of the host vehicle 100, the entering object detection area selection unit 1004 selects the avoidance route detection area 801 and the front detection area 803 as the entering object detection area Ad from among the plurality of detection area candidates Ca. In this case, the entering object detection area selection unit 1004 does not select the rear detection area 802 as entering object detection area Ad.

For example, when the traveling direction of the avoidance target lane 902 cannot be specified, and it thus cannot be determined whether the traveling direction of the avoidance target lane 902 is the same as or opposite to the traveling direction of the host vehicle 100, the entering object detection area selection unit 1004 selects all the detection area candidates Ca (801,802,803) illustrated in FIG. 8 as the entering object detection area Ad.

Next, with reference to FIGS. 9 and 10, the distance Dr corresponding to the length of the rear detection area 802 in the direction along the traveling direction of the host vehicle 100 (+X direction) and the distance Df corresponding to the length of the front detection area 803 in the direction along the traveling direction of the host vehicle 100 (+X direction) will be described.

As illustrated in FIG. 9, when the traveling direction of the avoidance target lane 902 is the same as the traveling direction of the host vehicle traveling lane 901, the rear detection area 802 is selected as the entering object detection area Ad. As illustrated in FIG. 10, the front detection area 803 is selected as the entering object detection area Ad when the traveling direction of the avoidance target lane 902 is opposite to the traveling direction of the host vehicle traveling lane 901.

The distance Dr illustrated in FIG. 9 is a value equal to or larger than the sum of the braking distance and the reaction distance of another vehicle (also referred to as a following vehicle) 102 traveling in the same direction as the traveling direction of the host vehicle 100 behind the host vehicle 100. The distance Df illustrated in FIG. 10 is a value equal to or greater than the sum of the braking distance and the reaction distance of another vehicle (also referred to as an oncoming vehicle) 103 traveling in the direction opposite to the traveling direction of the host vehicle 100 in front of the host vehicle 100.

The reaction distance is a distance that the vehicle travels from when the driver of the vehicle or an automated braking system recognizes an obstacle until braking by the brake device is started. The braking distance is a distance that the vehicle travels from the start of braking by the brake device until the vehicle stops.

The rear detection area setting unit 1003 and the front detection area setting unit 1002 each calculate the reaction distance based on the traveling speed information of the avoidance target lane 902 and a reaction time stored in advance in the nonvolatile memory 32. The reaction time refers to a time from when the driver of the vehicle or the automated braking system recognizes an obstacle until braking by the brake device is started. The rear detection area setting unit 1003 and the front detection area setting unit

1002 each calculate the braking distance based on the traveling speed information of the avoidance target lane 902, a friction coefficient between the tire and the road surface stored in advance in the nonvolatile memory 32, and the gravitational acceleration. Note that the friction coefficient may be a constant value, or may be selected from a plurality of friction coefficient candidates based on weather, road conditions, types, and the like.

The traveling speed information of the avoidance target lane 902 is, for example, the maximum speed (speed limit) of the avoidance target lane 902. The rear detection area setting unit 1003 and the front detection area setting unit 1002 set the maximum speed of the avoidance target lane 902 based on the road signs and the road markings detected by the external sensors A, B, C. Note that the rear detection area setting unit 1003 and the front detection area setting unit 1002 may each set the maximum speed of the avoidance target lane 902 based on the map information acquired from the host vehicle position detection device and the position information and the posture information of the host vehicle.

In addition, as the traveling speed information of the avoidance target lane 902, the traveling speed information of other vehicles traveling in the avoidance target lane 902 detected by the external sensors A, B, C may be accumulated in the storage device, and among the accumulated traveling speed information, the average or highest value of data from the current time to a predetermined time before may be adopted.

When the following vehicle 102 is present in the rear detection area 802, even if the driver of the following vehicle 102 or the automated braking system actuates the brake device after recognizing the vehicle 100 as an obstacle due to the deceleration of the vehicle 100, the following vehicle 102 may come into contact with the vehicle 100. That is, the rear detection area 802 is set as an area where the following vehicle 102 may come into contact with the host vehicle 100 when the following vehicle 102 is present in the area.

When the oncoming vehicle 103 is present in the front detection area 803, even if the driver of the oncoming vehicle 103 or the automated braking system activates the brake device after recognizing the vehicle 100 as an obstacle due to the deceleration of the vehicle 100, the oncoming vehicle 103 may come into contact with the vehicle 100. That is, when the oncoming vehicle 103 is present in the area, the front detection area 803 is set as an area where the oncoming vehicle 103 may come into contact with the host vehicle 100.

As described above, the entering object detection area setting unit 307 sets the entering object detection area Ad that is a part of the entire range detectable by the external sensors A, B, C.

The entering object detection unit 308 illustrated in FIG. 4 detects an object entering the entering object detection area Ad set by the entering object detection area setting unit 307, based on the immediate information If generated by the sensor fusion processing unit 302. In this manner, the entering object detection unit 308 refers to the immediate information If with a small amount of delay, and detects an entering object in the limited entering object detection area Ad. This can reduce the processing time of the entering object detection unit 308.

Based on the detection result of the entering object detection unit 308, the avoidance possibility determination unit 309 determines whether to execute an avoidance operation along the avoidance route 811. When the avoidance operation is executed when a new object is entering the entering object detection area Ad, the host vehicle 100 may come into contact with the object. That is, it can be said that the travelable area 800 recognized by the travelable-area recognition unit 305 does not function as an avoidance possibility area. That is, it can be said that the travelable area 800 is in an invalid state.

When an object that has entered the entering object detection area Ad is detected, the avoidance possibility determination unit 309 determines that the travelable area 800 is invalid and the avoidance operation will not be executed. When the object that has entered the entering object detection area Ad is not detected, the avoidance possibility determination unit 309 determines that the travelable area 800 is valid and the avoidance operation will be executed.

When the avoidance possibility determination unit 309 determines to execute the avoidance operation, the collision prevention control unit 304 outputs a control signal to the steering device, one of the control targets 40, operating the steering device to cause the host vehicle 100 to travel along the avoidance route 811.

When the avoidance possibility determination unit 309 determines not to execute the avoidance operation, the collision prevention control unit 304 outputs a control signal to an alarm device, one of the control targets 40, causing the alarm device to output an alarm. When the avoidance possibility determination unit 309 determines not to execute the avoidance operation, the collision prevention control unit 304 outputs a control signal to an impact mitigation device, one of the control targets 40, activating the impact mitigation device just before the collision. The impact mitigation device includes, for example, an airbag housed in a folded state and a gas generator for supplying gas to the airbag. Based on the immediate information If, the collision prevention control unit 304 outputs a control signal to the impact mitigation device just before the host vehicle 100 collides with the target object, supplying gas to the airbag to deploy the airbag.

<Flows of Processes Executed by In-Vehicle Electronic Control Device>

Figure 11:
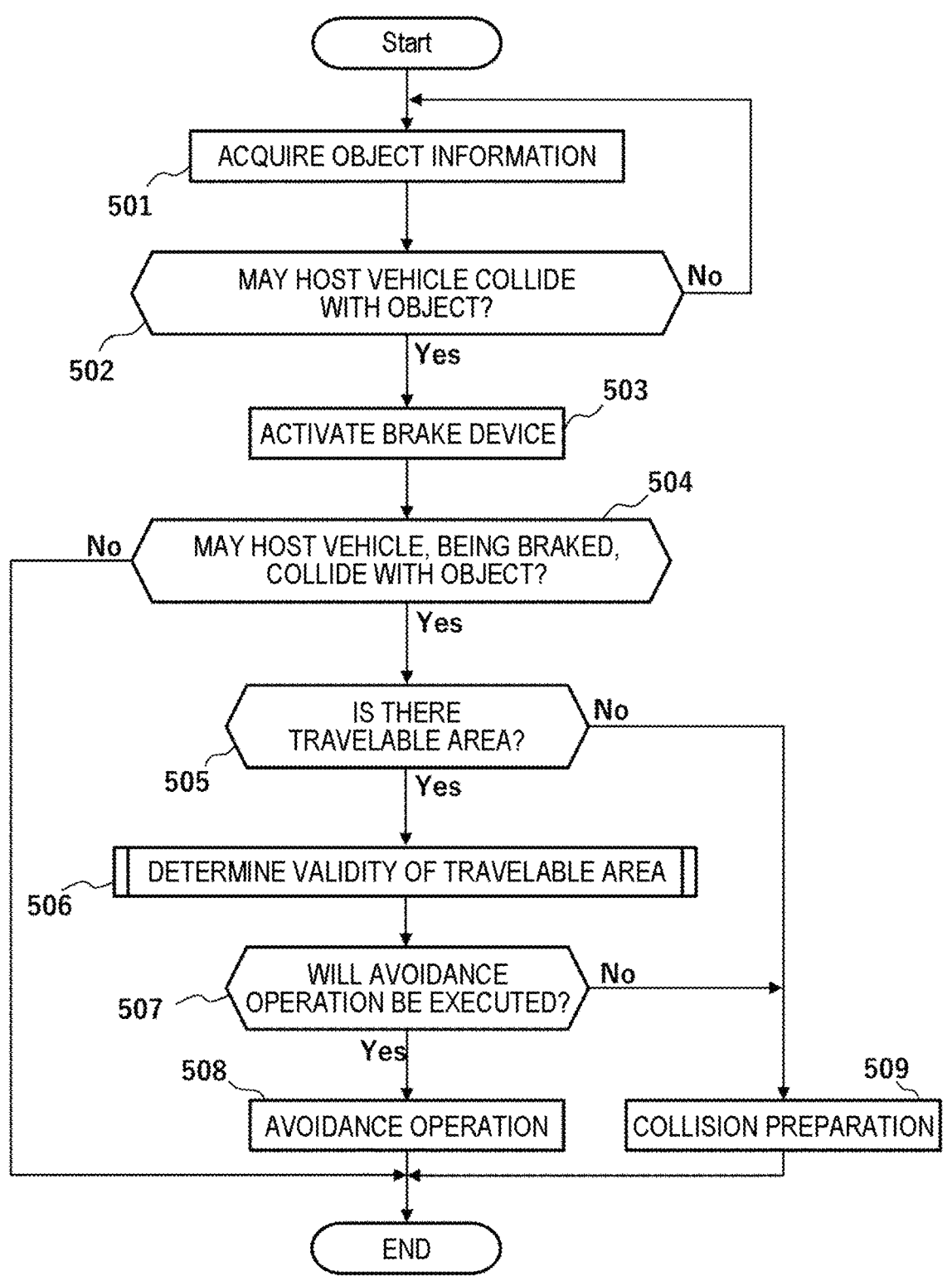
FIG. 11 is a diagram illustrating an example of a flow of each process of collision prevention control executed by the in-vehicle electronic control device.
Figure 12:
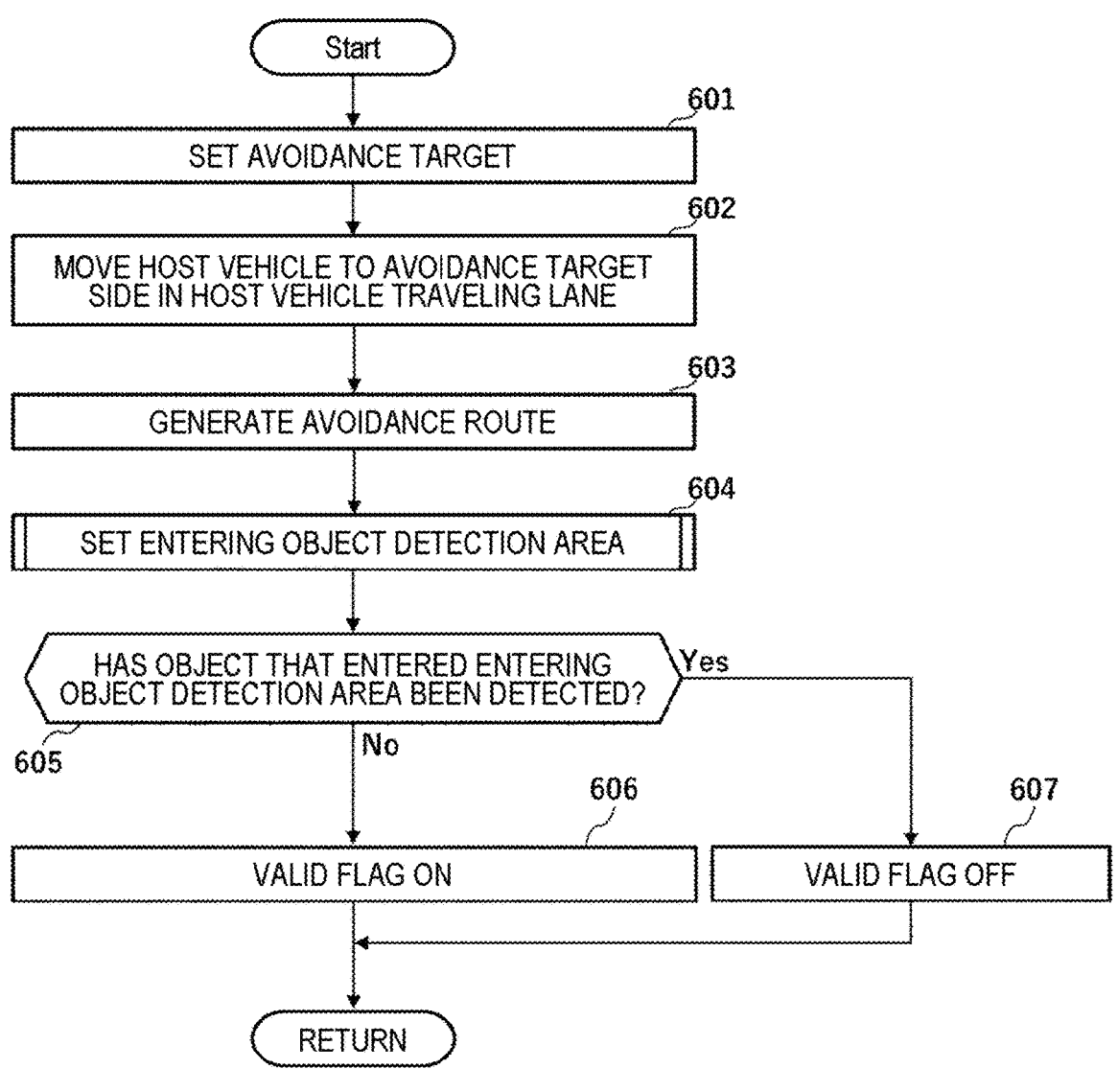
FIG. 12 is a diagram illustrating an example of a flow of a validity determination process for a travelable area in FIG. 11.

An example of flows of processes executed by the processing device 31 of the in-vehicle electronic control device 30 will be described with reference to FIGS. 11 to 13. FIG. 11 is a diagram illustrating an example of the flow of each process of the collision prevention control executed by the in-vehicle electronic control device 30. FIG. 12 is a diagram illustrating an example of the flow of a validity determination process for a travelable area in FIG. 11, and FIG. 13 is a diagram illustrating an example of the flow of a setting process for an entering object detection area in FIG. 12.

The process in the flowchart illustrated in FIG. 11 is started when an ignition switch (not illustrated) of the host vehicle 100 is turned on, for example, and is repeatedly executed in a predetermined control cycle. As illustrated in FIG. 11, in step S501, the in-vehicle electronic control device 30 acquires, from the external sensors A, B, C, object information of an object present around the host vehicle 100 detected by the external sensors A, B, C. The in-vehicle electronic control device 30 stores the acquired object information, and generates immediate information If and integrated information Ii based on the acquired object information.

In the next step S502, based on the immediate information If, the in-vehicle electronic control device 30 executes a first collision prediction process to determine whether the host vehicle 100 maintaining the current speed may collide with the object present around the host vehicle 100. The in-vehicle electronic control device 30 determines whether the host vehicle 100 may collide with the object based on the relative position and the relative speed between the host vehicle 100 and the object included in the immediate information If. When it is determined in step S502 that the host vehicle 100 may collide with the object, the process proceeds to step S503. When it is determined in step S502 that the host vehicle 100 may not collide with the object, the process returns to step S501.

In step S503, the in-vehicle electronic control device 30 outputs a control signal to the brake device, one of the control targets 40, activating the brake device to start the braking of the host vehicle 100. When the process of step S503 is executed, the host vehicle 100 starts to decelerate. Note that the brake device is maintained in operation.

In the next step S504, based on the immediate information If, the in-vehicle electronic control device 30 executes a second collision prediction process to determine whether the host vehicle 100, while being braked by the brake device, may collide with an object present around the host vehicle 100. The in-vehicle electronic control device 30 determines whether the host vehicle 100 may collide with the object based on the relative position and the relative speed between the host vehicle 100 and the object included in the immediate information If and the time rate of change (acceleration) in speed by braking of the host vehicle 100.

When it is determined in step S504 that the host vehicle 100 may collide with the object, the process proceeds to step S505. When it is determined in step S504 that the host vehicle 100 may not collide with the object, the process illustrated in the flowchart of FIG. 11 is ended. When a negative determination is made in step S504, the operation of the brake device is continued, so that the host vehicle 100 stops without colliding with the object (target object) predicted to possibly collide in step S502. This prevents a collision between the host vehicle 100 and the target object.

In step S505, the in-vehicle electronic control device 30 determines whether there is a travelable area 800 in which the avoidance route 811 can be generated. As described above, the in-vehicle electronic control device 30 calculates the distribution of the free space based on the integrated information Ii, and sets the travelable area 800 based on the calculation result. The travelable area 800 is repeatedly set in a predetermined control cycle. However, the travelable area 800 is data older than the current time by the delay time of the travelable-area recognition process (the time required for recognition).

When it is determined in step S505 that there is a travelable area 800 in which the avoidance route 811 can be generated, the process proceeds to step S506. When it is determined in step S505 that there is no travelable area 800 in which the avoidance route 811 can be generated, the process proceeds to step S509.

In step S506, the in-vehicle electronic control device executes a validity determination process for the travelable area 800, and proceeds to step S507. In step S506, the in-vehicle electronic control device 30 determines that the travelable area 800, which is data older by the delay time of the travelable-area recognition process, is invalid when an object entering the entering object detection area Ad is detected based on the immediate information If before the travelable area is recognized based on the current object information. In step S506, when an object entering the entering object detection area Ad is not detected based on the immediate information If, the in-vehicle electronic control device 30 determines that the travelable area 800, which is data older by the delay time of the travelable-area recognition process, is valid. Note that a detailed process flow of step S506 will be described later.

In step S507, the in-vehicle electronic control device 30 determines whether to execute the avoidance operation based on the result of the validity determination process for the travelable area 800. In step S507, when It is determined by the validity determination process for the travelable area 800 that the travelable area 800 is valid (S506), the in-vehicle electronic control device 30 determines to execute the avoidance operation and advances the process to step S508. In step S507, when it is determined by the validity determination process for the travelable area 800 that the travelable area 800 is invalid (S506), the in-vehicle electronic control device 30 determines not to execute the avoidance operation and advances the process to step S509.

In step S508, the in-vehicle electronic control device 30 outputs a control signal to the steering device, one of the control targets 40, causing the host vehicle 100 to perform the avoidance operation along the avoidance route 811 generated in step S603 (cf. FIG. 12) to be described later. As a result, the host vehicle 100 travels along the avoidance route 811 while decelerating, and stops at the avoidance target 810. When the avoidance operation is completed, the process illustrated in the flowchart of FIG. 11 ends.

In step S509, the in-vehicle electronic control device 30 executes a collision preparation process to prepare for a collision without performing the avoidance operation of the host vehicle 100. In step S509, the in-vehicle electronic control device 30 outputs a control signal to an alarm device, one of the control targets 40, causing the alarm device to output an alarm before collision, thereby urging the occupant of the host vehicle 100 to prepare to withstand the collision. In step S509, the in-vehicle electronic control device 30 activates the impact mitigation device, one of the control targets 40, deploying the airbag prior to the collision. As a result, it is possible to alleviate the impact inside the vehicle interior and protect the occupant. When the collision preparation is completed, the process illustrated in the flowchart of FIG. 11 ends.

With reference to FIG. 12, the flow of the validity determination process for the travelable area 800 (S506 in FIG. 11) will be described. As illustrated in FIG. 12, in step S601, the in-vehicle electronic control device 30 sets the avoidance target 810 and advances the process to step S602.

The in-vehicle electronic control device 30 sets the avoidance target 810 on the right side or the left side of the host vehicle traveling lane 901. When the travelable area 800 is present only on one of the left and right sides of the host vehicle traveling lane 901, the in-vehicle electronic control device 30 sets the avoidance target 810 on the side where the travelable area 800 is present. When the travelable area 800 is present on both the left and right sides of the host vehicle traveling lane 901, the in-vehicle electronic control device 30 sets the avoidance target 810 on the side where the space between the left or right end of the host vehicle traveling lane 901 and the left or right side of the target object is larger. For example, when the distance between the right end of the host vehicle traveling lane 901 and the right side of the target object (another vehicle 101 illustrated in FIG. 8) is larger than the distance between the left end of the host vehicle traveling lane 901 and the left side of the target object, the in-vehicle electronic control device 30 sets the avoidance target 810 on the right side of the host vehicle traveling lane 901.

In step S602, the in-vehicle electronic control device 30 outputs a control signal (operation command) to the steering device to move the host vehicle 100 to the avoidance target 810 side in the host vehicle traveling lane 901. As described above, before the process of determining whether to execute the avoidance operation along the avoidance route 811 (S507 in FIG. 11), by bringing the host vehicle 100 to the avoidance target 810 side in the host vehicle traveling lane 901, it is possible to improve the field of view (detection range) on the avoidance target 810 side in front of the host vehicle 100 by any of the external sensors A1, A2.

In the next step S603, the in-vehicle electronic control device 30 generates the avoidance route 811 with the front end of the host vehicle 100 as a start point and the avoidance target 810 as an end point, and the process proceeds to step S604. In step S604, the in-vehicle electronic control device 30 sets the entering object detection area Ad, and the process proceeds to step S605.

In step S605, based on the immediate information If, the in-vehicle electronic control device 30 determines whether an object that has entered the entering object detection area Ad set in step S604 has been detected. This process is completed within a processing time until the travelable area is recognized based on the current object information. When it is determined in step S605 that an object that has entered the entering object detection area Ad has not been detected, the process proceeds to step S606. When it is determined in step S605 that an object that has entered the entering object detection area Ad has been detected, the process proceeds to step S607.

In step S606, the in-vehicle electronic control device 30 sets a valid flag to on. In step S607, the in-vehicle electronic control device 30 sets the valid flag to off. The valid flag is a flag representing the result of the validity determination process for the travelable area 800, and is set to on when it is determined that the travelable area 800 is valid (S606), and is set to off when it is determined that the travelable area 800 is invalid (S607). When the flag setting process in step S606 or step S607 ends, the process illustrated in the flowchart of FIG. 12 ends, and the process proceeds to step S507 of FIG. 11.

The flow of the setting process for the entering object detection area Ad (S604 in FIG. 12) will be described with reference to FIG. 13. As illustrated in FIG. 13, in step S701, the in-vehicle electronic control device 30 sets the avoidance route detection area 801, the rear detection area 802, and the front detection area 803 as the three detection area candidates Ca, and the process proceeds to step S702.

In step S702, the in-vehicle electronic control device 30 executes a process of specifying the traveling direction of the avoidance target lane 902, which is a lane in which the avoidance target 810 is set, and advances the process to step S703.

In step S703, the in-vehicle electronic control device 30 determines whether the traveling direction of the avoidance target lane 902 could be specified in step S702. When it is determined in step S702 that the traveling direction of the avoidance target lane 902 could be specified, the process proceeds to step S704. When it is determined in step S702 that the traveling direction of the avoidance target lane 902 could not be specified, the process proceeds to step S707.

In step S704, the in-vehicle electronic control device 30 determines whether the traveling direction of the avoidance target lane 902 specified in step S702 is the same as or opposite to the traveling direction of the host vehicle 100 (the traveling direction of the host vehicle traveling lane 901). When it is determined in step S704 that the traveling direction of the avoidance target lane 902 is the same as the traveling direction of the host vehicle 100, the process proceeds to step S705. When it is determined in step S704 that the traveling direction of the avoidance target lane 902 is opposite to the traveling direction of the host vehicle 100, the process proceeds to step S706.

In step S705, the in-vehicle electronic control device 30 selects the avoidance route detection area 801 and the rear detection area 802 as the entering object detection area Ad from among the plurality of detection area candidates Ca set in step S701.

In step S706, the in-vehicle electronic control device 30 selects the avoidance route detection area 801 and the front detection area 803 as the entering object detection area Ad from among the plurality of detection area candidates Ca set in step S701.

In step S707, the in-vehicle electronic control device 30 selects all the detection area candidates Ca, that is, the avoidance route detection area 801, the rear detection area 802, and the front detection area 803 as the entering object detection area Ad from among the plurality of detection area candidates Ca set in step S701.

When the process of selecting the entering object detection area Ad in step S705, step S706, or step S707 ends, the process shown in the flowchart of FIG. 13 ends, and the process proceeds to step S605 of FIG. 12.

According to the embodiment described above, the following operational effects are obtained.

(1) The in-vehicle electronic control device 30 includes the processing device 31 that acquires the object information Ia, Ib, Ic of an object detected by the plurality of external sensors A, B, C mounted on the host vehicle 100, and executes the integration process to integrate the plurality of acquired object information Ia, Ib, Ic. The processing device 31 recognizes the travelable area 800 on the road surface around the host vehicle 100 that the host vehicle 100 can enter, based on the result of the integration process (integrated information Ii).

The processing device 31 predicts whether the host vehicle 100 and the object will collide, based on object information (immediate information If) before the integration process. When a collision is predicted between the host vehicle 100 and the object, the avoidance target 810 is set to avoid a collision with the object (target object) predicted to collide. The processing device 31 generates the avoidance route 811, which leads to the avoidance target 810, in the travelable area 800. Note that the travelable area 800 used here is data older than the current time by the time required for the integration process and the travelable area recognition process.

The processing device 31 sets the entering object detection area Ad around the host vehicle 100 to detect the entry of an object. The processing device 31 detects an object that has entered the entering object detection area Ad based on the object information (immediate information If) of the object, detected by the plurality of external sensors A, B, C, before the integration process and determines whether to execute the avoidance operation along the avoidance route 811, based on the detection result.

In this configuration, the processing device 31 of the in-vehicle electronic control device 30 executes the process of integrating the object information of the object detected by the plurality of external sensors A, B, C. The processing device 31 recognizes the travelable area 800 with high accuracy based on the integrated information Ii that is the result of the integration process. The processing device 31 can improve comfort and convenience during steady driving by executing driving assistance control, such as ACC and lane keeping, based on the travelable area 800. However, the time required for the process from the detection by the external sensors A, B, C to the recognition of the size and shape of the travelable area 800 is longer than that required for other processes. Therefore, at the current time, the object may have approached the periphery of the avoidance route 811 in the travelable area 800.

Therefore, when a collision with the object is predicted, the processing device 31 of the in-vehicle electronic control device 30 according to the present embodiment detects an object that has entered the entering object detection area Ad set around the host vehicle 100, based on the object information (immediate information If) before the integration process. As a result, the processing device 31 determines the validity of the travelable area 800 recognized at the current time, that is, stored in the storage device, and determines whether to execute the avoidance operation based on the determination result. That is, when an object enters the entering object detection area Ad, it is determined that the travelable area 800 is invalid, and the avoidance operation is not executed. As a result, it is possible to prevent the occurrence of an event in which an object different from the object to be avoided (e.g., another vehicle 101 illustrated in FIG. 8) comes into contact with the host vehicle 100 due to the avoidance operation accompanying a change in the traveling direction of the host vehicle 100.

(2) The processing device 31 sets a plurality of detection area candidates Ca along the traveling direction of the host vehicle 100. The processing device 31 selects the detection area candidate Ca to be the entering object detection area Ad from among the plurality of detection area candidates Ca, based on the relationship between the traveling direction of the lane (avoidance target lane 902) in which the avoidance target 810 is set and the traveling direction of the host vehicle 100 (the traveling direction of the host vehicle traveling lane 901).

In this configuration, the entering object detection area Ad can be limited to an appropriate monitoring range according to the relationship between the traveling direction of the avoidance target lane 902 and the traveling direction of the host vehicle 100. This can reduce the amount of data handled in the detection process for an object in the entering object detection area Ad, thus reducing the processing time. As a result, the processing device 31 can promptly determine whether to execute the avoidance operation.

(3) The plurality of detection area candidates Ca include the avoidance route detection area 801 including the avoidance route 811, the front detection area 803 set in front of the avoidance route detection area 801, and the rear detection area 802 set behind the avoidance route detection area 801.

When the avoidance route detection area 801 is selected as the entering object detection area Ad, it is possible to avoid contact between the host vehicle 100 and an object approaching the periphery of the avoidance route 811. When the front detection area 803 is selected as the entering object detection area Ad, it is possible to avoid contact between the host vehicle 100 and an object such as the oncoming vehicle 103 approaching the host vehicle 100 from ahead of the avoidance route 811. When the rear detection area 802 is selected as the entering object detection area Ad, it is possible to avoid contact between the host vehicle 100 and an object such as the following vehicle 102 approaching the host vehicle 100 from behind the avoidance route 811.

(4) When the traveling direction of the lane (avoidance target lane 902) in which the avoidance target 810 is set is the same as the traveling direction of the host vehicle 100, the processing device 31 selects the avoidance route detection area 801 and the rear detection area 802 as the entering object detection area Ad from among the plurality of detection area candidates Ca. In this case, the processing device 31 does not select the front detection area 803 as the entering object detection area Ad.

The processing device 31 determines the length Dr of the rear detection area 802 in the direction along the traveling direction of the host vehicle 100 based on the traveling speed information of the lane (avoidance target lane 902) in which the avoidance target 810 is set (e.g., the maximum speed of the avoidance target lane 902).

When the traveling direction of the host vehicle 100 and the traveling direction of the avoidance target lane 902 are the same, the possibility of contact with the following vehicle 102 is higher than that with the oncoming vehicle 103. Therefore, the processing device 31 does not select the front detection area 803 as the entering object detection area Ad, but selects the avoidance route detection area 801 and the rear detection area 802 as the entering object detection area Ad. This can reduce the calculation load of the processing device 31, appropriately avoiding contact between the host vehicle 100 and the following vehicle 102.

The length Dr of the rear detection area 802 is determined based on the traveling speed information of the avoidance target lane 902 instead of the fixed value. For example, the processing device 31 increases the length Dr of the rear detection area 802 in proportion to the higher maximum speed (speed limit) of the avoidance target lane 902. As a result, it is possible to appropriately prevent contact between the following vehicle 102 traveling in the avoidance target lane 902 and the host vehicle 100 during the avoidance operation. In addition, the processing device 31 reduces the length Dr of the rear detection area 802 in proportion to the higher maximum speed (speed limit) of the avoidance target lane 902. As a result, the calculation load of the processing device 31 can be reduced.

(5) When the traveling direction of the lane (avoidance target lane 902) in which the avoidance target 810 is set is opposite to the traveling direction of the host vehicle 100, the processing device 31 selects the avoidance route detection area 801 and the front detection area 803 as the entering object detection area Ad from among the plurality of detection area candidates Ca. In this case, the processing device 31 does not select the rear detection area 802 as the entering object detection area Ad.

The processing device 31 determines the length Df of the front detection area 803 in the direction along the traveling direction of the host vehicle 100 based on the traveling speed information of the lane (avoidance target lane 902) in which the avoidance target 810 is set (e.g., the maximum speed of the avoidance target lane 902).

When the traveling direction of the host vehicle 100 and the traveling direction of the avoidance target lane 902 are opposite to each other, the possibility of contact with the oncoming vehicle 103 is higher than with the following vehicle 102. Therefore, the processing device 31 does not select the rear detection area 802 as the entering object detection area Ad, but selects the avoidance route detection area 801 and the front detection area 803 as the entering object detection area Ad. This can reduce the calculation load of the processing device 31, appropriately avoiding contact between the host vehicle 100 and the oncoming vehicle 103.

The length Df of the front detection area 803 is determined based on the traveling speed information of the avoidance target lane 902 instead of the fixed value. For example, the processing device 31 increases the length Df of the front detection area 803 in proportion to the higher maximum speed (speed limit) of the avoidance target lane 902. As a result, it is possible to appropriately prevent
contact between the oncoming vehicle 103 traveling in the
avoidance target lane 902 and the host vehicle 100 during
the avoidance operation. In addition, the processing device
31 reduces the length Df of the front detection area 803 in
proportion to the higher maximum speed (speed limit) of the
avoidance target lane 902. As a result, the calculation load
of the processing device 31 can be reduced.

(6) When a collision is predicted between the host vehicle
100 and an object present in front of the host vehicle 100, the
processing device 31 sets the avoidance target 810 outside
the host vehicle traveling lane 901 (in the present embodi-
ment, a lane adjacent to the host vehicle traveling lane 901)
that is a lane in which the host vehicle 100 travels. Before
the process of determining whether to execute the avoidance
operation along the avoidance route 811, the processing
device 31 outputs a control signal (operation command) to
the steering device (control target 40) to move the host
vehicle 100 to the avoidance target 810 side in the host
vehicle traveling lane 901.

In this configuration, by bringing the host vehicle 100
closer to the avoidance target 810 side in the host vehicle
traveling lane 901, it is possible to improve the field of view
(detection range) on the avoidance target 810 side in front of
the host vehicle 100 by the external sensor (e.g., the external
sensors A1, A2).

(7) The processing device 31 sets the entering object
detection area Ad in a lane (avoidance-destination adjacent
lane 903) that is opposite to the host vehicle traveling lane
901 among the host vehicle traveling lane 901, the avoid-
ance target lane 902, and a lane adjacent to the avoidance
target lane 902. As described above, by setting not only the
host vehicle traveling lane 901 and the avoidance target lane
902 but also a lane farther from the host vehicle 100 as a
monitoring target, it is possible to more appropriately pre-
vent contact between the host vehicle 100 and the object
during the avoidance operation.

As described above, according to the present embodi-
ment, the entering object detection area Ad can be appro-
priately set according to the traveling direction of the
avoidance target lane 902, the number of lanes on the road,
and the traveling speed information of the avoidance target
lane 902. In addition, based on the immediate information If
with a small delay, it is possible to appropriately and early
determine whether to execute the avoidance operation
involving a change in the direction (traveling direction) of
the host vehicle 100. When it is determined to execute the
avoidance operation, the host vehicle 100 can avoid the
target object and stop at the avoidance target 810. When it
is determined not to execute the avoidance operation, it is
possible to prevent contact with an object approaching the
avoidance route 811 (a new object different from the target
object predicted to collide).

The following modifications of the present embodiment
are also within the scope of the present invention, and it is
also possible to combine the configuration illustrated in the
modification with the configuration described in the above
embodiment, or combine the configurations described in the
following different modifications.
<Modification 1>

The detection area candidate (small area) Ca set as the
candidate for the entering object detection area Ad is not
limited to the example described in the above embodiment
(cf. FIG. 8). The detection area candidate Ca can be appro-
priately changed according to the configuration of the road
such as the position of the host vehicle 100, the number of
lanes in the same traveling direction as the host vehicle traveling lane 901, and the number of lanes (opposite lanes)
in the traveling direction opposite to the host vehicle trav-
eling lane 901.
<Modification 1-1>

Figure 14:
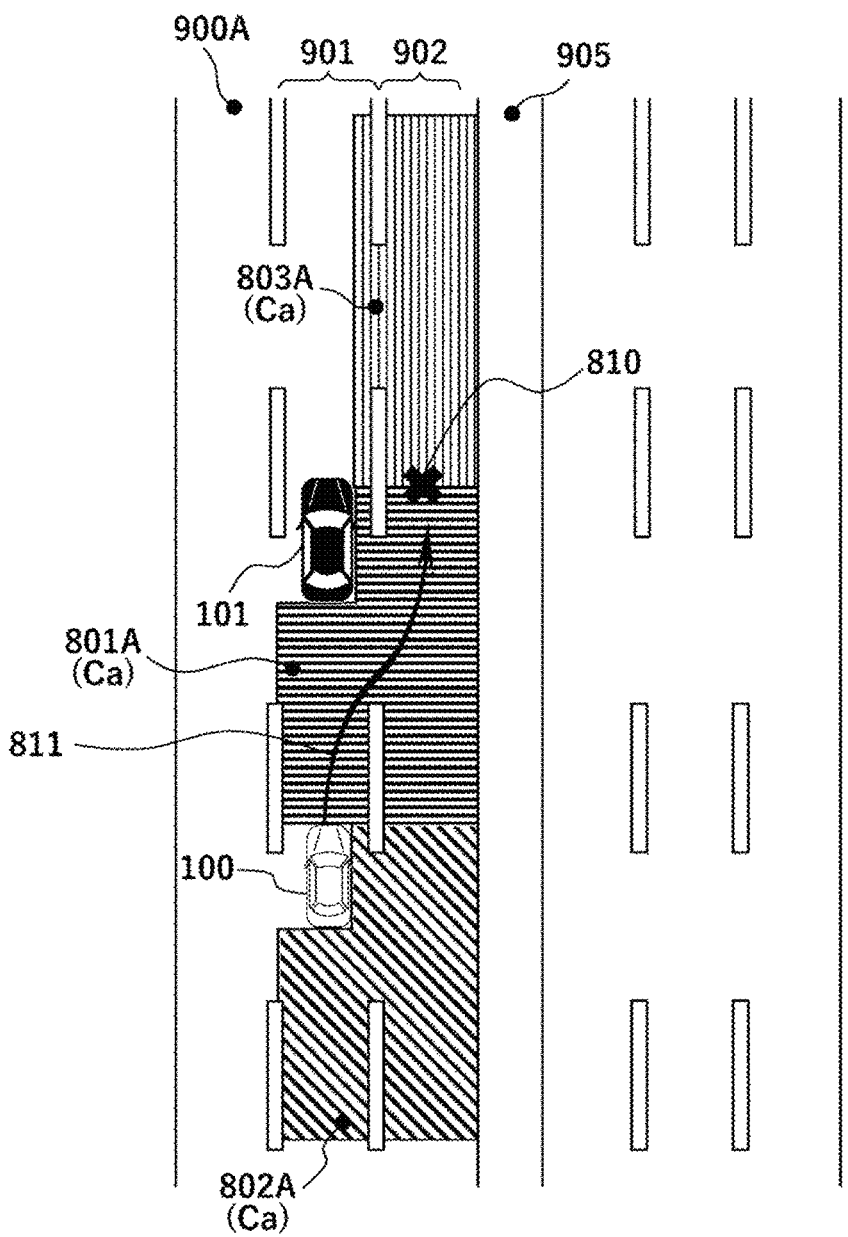
FIG. 14 is a schematic plan view of a road with a median strip and three lanes on one side.

FIG. 14 is a schematic plan view of a road 900A with a
median strip 905 and three lanes on one side. As illustrated
in FIG. 14, the host vehicle 100 is traveling in the center lane
among the three lanes on the left side in the drawing. In this
case, the travelable-area recognition unit 305 sets a travel-
able area (not illustrated) to the host vehicle traveling lane
901 and the lanes on the left and right sides of the host
vehicle traveling lane 901.

The avoidance route generation unit 306 sets the avoid-
ance target 810 in the lane adjacent to the right side of the
host vehicle traveling lane 901. The entering object detec-
tion area setting unit 307 sets an avoidance route detection
area 801A, a rear detection area 802A, and a front detection
area 803A to the host vehicle traveling lane 901 and the
avoidance target lane 902 that is the lane in which the
avoidance target 810 is set.

In the above embodiment, the example has been described
in which the detection area candidate Ca is set for three
lanes, that is, the host vehicle traveling lane 901, the
avoidance target lane 902, and the avoidance-destination
adjacent lane 903 (cf. FIG. 8). On the other hand, in the
present modification, the detection area candidate Ca is set
for two lanes of the host vehicle traveling lane 901 and the
avoidance target lane 902.
<Modification 1-2>

Figure 15:
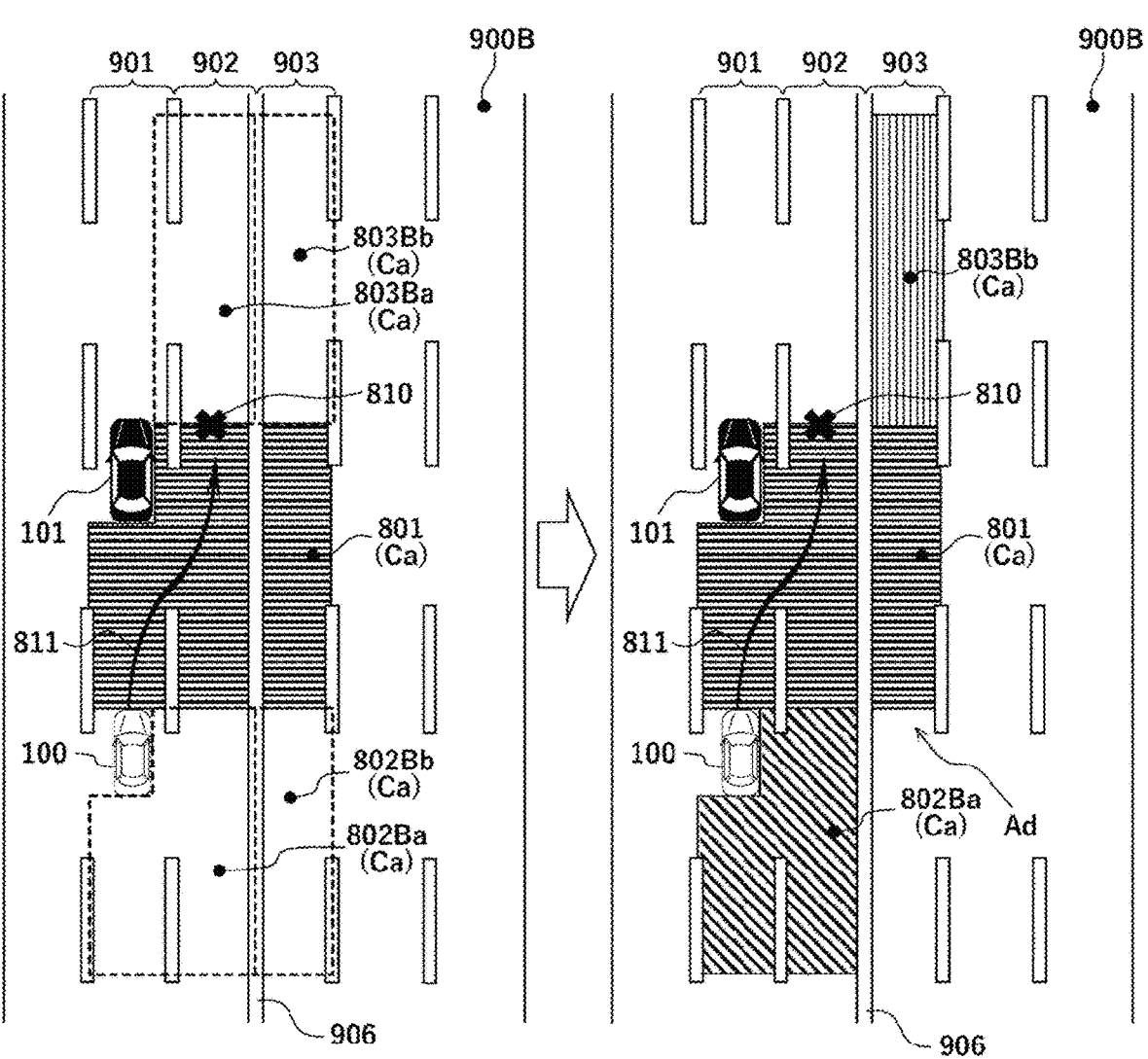
FIG. 15 is a schematic plan view of a road with three lanes on one side, and illustrates an example in which detection area candidates are set to cross a center line.

FIG. 15 is a schematic plan view of a road 900B with
three lanes on one side, and illustrates an example in which
the detection area candidates Ca are set to cross a center line
906. In the above embodiment, the example has been
described in which the entering object detection area Ad is
selected based on the relationship between the traveling
direction of the avoidance target lane 902 and the traveling
direction of the host vehicle 100. On the other hand, in this
Modification 1-2, the entering object detection area selection
unit 1004 selects the entering object detection area Ad in
consideration of not only the relationship between the trav-
eling direction of the avoidance target lane 902 and the
traveling direction of the host vehicle 100 but also the
relationship between the traveling direction of the avoid-
ance-destination adjacent lane 903 and the traveling direc-
tion of the host vehicle 100.

As illustrated in FIG. 15, in the present modification, five
detection area candidates Ca are set. Similarly to the above
embodiment, the avoidance route detection area setting unit
1001 sets the avoidance route detection area 801 including
the avoidance route 811 as the detection area candidate Ca.

The rear detection area setting unit 1003 sets a first rear
detection area 802Ba and a second rear detection area 802Bb
as the detection area candidates Ca. The first rear detection
area 802Ba is set to the host vehicle traveling lane 901 and
the avoidance target lane 902. The second rear detection area
802Bb is set to the avoidance-destination adjacent lane 903.

The front detection area setting unit 1002 sets a first front
detection area 803Ba and a second front detection area
803Bb as the detection area candidates Ca. The first front
detection area 803Ba is set to the host vehicle traveling lane
901 and the avoidance target lane 902. The second front
detection area 803Bb is set to the avoidance-destination
adjacent lane 903.

The entering object detection area selection unit 1004
selects the detection area candidate Ca to be the entering
object detection area Ad from among the plurality of detec-
tion area candidates Ca, based on the relationship among the traveling direction of the host vehicle 100, the traveling direction of the avoidance target lane 902, and the traveling direction of the avoidance-destination adjacent lane 903.

The entering object detection area selection unit 1004 determines whether the traveling directions of the avoidance target lane 902 and the avoidance-destination adjacent lane 903 are the same as the traveling direction of the host vehicle 100.

When the traveling direction of the avoidance target lane 902 is the same as the traveling direction of the host vehicle 100 and the traveling direction of the avoidance-destination adjacent lane 903 is opposite to the traveling direction of the host vehicle 100, the entering object detection area selection unit 1004 sets the avoidance route detection area 801, the first rear detection area 802Ba, and the second front detection area 803Bb as the entering object detection area Ad. In this case, the entering object detection area selection unit 1004 does not select the second rear detection area 802Bb and the first front detection area 803Ba as the entering object detection area Ad.

Although not illustrated, when the traveling directions of the avoidance target lane 902 and the avoidance-destination adjacent lane 903 are the same as the traveling direction of the host vehicle 100, the entering object detection area selection unit 1004 selects the avoidance route detection area 801, the first rear detection area 802Ba, and the second rear detection area 802Bb as the entering object detection area Ad. When the traveling directions of the avoidance target lane 902 and the avoidance-destination adjacent lane 903 are opposite to the traveling direction of the host vehicle 100, the entering object detection area selection unit 1004 selects the avoidance route detection area 801, the first front detection area 803Ba, and the second front detection area 803Bb as the entering object detection area Ad.

Furthermore, when the traveling directions of the avoidance target lane 902 and the avoidance-destination adjacent lane 903 cannot be specified and it cannot be determined whether the traveling directions of the avoidance target lane 902 and the avoidance-destination adjacent lane 903 are the same as or opposite to the traveling direction of the host vehicle 100, the entering object detection area selection unit 1004 selects all the detection area candidates Ca(801, 802Ba, 802Bb, 803Ba, 803Bb) as the entering object detection area Ad.

According to the present modification, when the host vehicle 100 performs the avoidance operation in the situation illustrated in FIG. 15, it is possible to more appropriately prevent contacts between the host vehicle 100 and each of the following vehicle 102 and the oncoming vehicle 103 while reducing the calculation load of the processing device 31.

<Modification 2>

In the above embodiment, the example has been described in which the entering object detection area setting unit 307 selects the detection area candidate Ca to be the entering object detection area Ad from among the plurality of detection area candidates Ca, based on the relationship between the traveling direction of the avoidance target lane 902 and the traveling direction of the host vehicle 100, but the present invention is not limited thereto.

The entering object detection area setting unit 307 may always set the avoidance route detection area 801, the rear detection area 802, and the front detection area 803 as the entering object detection area Ad regardless of the relationship between the traveling direction of the avoidance target lane 902 and the traveling direction of the host vehicle 100

<Modification 3>

In the above embodiment, the example has been described in which the entering object detection area setting unit 307 sets the avoidance route detection area 801 to include the avoidance route 811, and determines the length Dr of the rear detection area 802 and the length Df of the front detection area 803 based on the traveling speed information of the avoidance target lane 902, but the present invention is not limited thereto.

For example, the entering object detection area setting unit 307 may set the entering object detection area Ad stored in advance in the storage device. That is, the size and shape of the entering object detection area Ad may be always constant. In this case, the entering object detection area Ad is preferably determined based on the avoidance route with the maximum possible length and the highest vehicle speed for the avoidance target lane. As a result, the processing time for setting the entering object detection area Ad can be reduced.

<Modification 4>

In the above embodiment, an example in which the avoidance route generation unit 306 generates the single avoidance route 811 has been described, but in the present modification, an example in which the avoidance route generation unit 306 generates the plurality of avoidance routes 811 will be described. When the avoidance route generation unit 306 generates a plurality of avoidance routes 811, the entering object detection area setting unit 307 sets the entering object detection area Ad for each avoidance route 811.

The entering object detection unit 308 determines whether an object has entered each of the plurality of entering object detection areas Ad. The avoidance possibility determination unit 309 determines to execute the avoidance operation when there is even one entering object detection area Ad in which an object is not detected by the entering object detection unit 308. When the entering object detection unit 308 determines an object in every entering object detection area Ad, the avoidance possibility determination unit 309 determines not to execute the avoidance operation. The avoidance possibility determination unit 309 determines to execute the avoidance operation along the avoidance route 811 corresponding to the entering object detection area Ad in which no object has been detected among the plurality of entering object detection areas Ad.

When there are a plurality of entering object detection areas Ad in which no object has been detected, the collision prevention control unit 304 selects the avoidance route 811 corresponding to one entering object detection area Ad, that is, a valid avoidance route 811, from among the plurality of entering object detection areas Ad. When the avoidance possibility determination unit 309 determines to execute the avoidance operation, the collision prevention control unit 304 operates the host vehicle 100 along the selected valid avoidance route 811.

Although the embodiment of the present invention has been described above, the above embodiment merely illustrates a part of the application example of the present invention, and the technical scope of the present invention is not intended to be limited to the specific configuration of the above embodiment. For example, the above embodiment has been described in detail for easy understanding of the present invention, and is not necessarily limited to those having all the described configurations. Furthermore, a part of the configuration of one embodiment can be replaced with the configuration of another embodiment, and the configuration of another embodiment can be added to the configuration of one embodiment. In addition, a part of the configuration of each embodiment can be added, deleted, or replaced with the configuration of another embodiment.

In addition, some or all of the configurations described above, functions, and the like may be realized by hardware, for example, by designing with an integrated circuit. In addition, each of the configurations, functions, and the like described above may be realized by software by a processor interpreting and executing a program for realizing each function. Information such as a program, a table, and a file for realizing each function can be stored in a storage device such as a memory, a hard disk, and a solid-state drive (SSD), or a recording medium such as an integrated circuit (IC) card, a secured digital (SD) card, and a digital versatile disc (DVD). In addition, the control lines and the information lines are indicated as considered necessary for the description, and not all the control lines and the information lines are necessarily illustrated in the product. In practice, almost all the configurations may be considered interconnected.

REFERENCE SIGNS LIST 30 in-vehicle electronic control device
31 processing device
32 non-volatile memory (storage device)
33 volatile memory (storage device)
34 input interface
35 output interface
40 control target (steering device, brake device, alarm device, impact mitigation device)
90 object
100 vehicle (host vehicle)
101 another vehicle (target object)
102 following vehicle (another vehicle)
103 oncoming vehicle (another vehicle)
302 sensor fusion processing unit
303 accuracy priority control unit
304 collision prevention control unit
305 travelable-area recognition unit
306 avoidance route generation unit
307 entering object detection area setting unit
308 entering object detection unit
309 avoidance possibility determination unit
401A1 to 401A4, 401B1, 401B2, 401C1 to 401C8 time synchronization processing unit
402 integration processing unit
800 travelable area
801, 801A avoidance route detection area (detection area candidate)
802, 802A rear detection area (detection area candidate)
802Ba first rear detection area (detection area candidate)
802Bb second rear detection area (detection area candidate)
803, 803A front detection area (detection area candidate)
803Ba first front detection area (detection area candidate)
803Bb second front detection area (detection area candidate)
810 avoidance target
811 avoidance route
900, 900A, 900B road
901 host vehicle traveling lane (hatched line)
902 avoidance target lane (lane)
903 avoidance-destination adjacent lane (lane)
905 median strip
906 center line
1001 avoidance route detection area setting unit
1002 front detection area setting unit
1003 rear detection area setting unit 1004 entering object detection area selection unit
A1 to A4, B1, B2, C1 to C8 external sensor
Ad entering object detection area
Ca detection area candidate
Df distance (length of front detection area)
Dr distance (length of rear detection area)
Ia1 to Ia4, Ib1, Ib2, Ic1 to Ic8 object information (detection information)
If immediate information (object information before integration process)
Ii integrated information (result of integration process)
VA1 to VA4, VB1, VB2, VC viewing range (detection range)

The invention claimed is:

1. An in-vehicle electronic control device comprising a processing device that acquires object information of an object detected by each of a plurality of external sensors mounted on a host vehicle and executes an integration process to integrate a plurality of pieces of the object information acquired, wherein the processing device is configured to:

recognize a travelable area on a road surface around the host vehicle that the host vehicle enters, based on a result of the integration process, predict whether the host vehicle and the object will collide, based on the object information, set an avoidance target for avoiding a collision with the object predicted to collide when a collision between the host vehicle and the object is predicted, generate an avoidance route in the travelable area, the avoidance route leading to the avoidance target, set an entering object detection area around the host vehicle to detect entry of the object, set a plurality of detection area candidates along a traveling direction of the host vehicle, select one or more of the detection area candidates as the entering object detection area from among the plurality of detection area candidates, based on a relationship between a traveling direction of a lane in which the avoidance target is set and a traveling direction of the host vehicle, and detect the object having entered the entering object detection area based on the object information of the object before the integration process, the object having been detected by the plurality of external sensors, and determine whether to execute an avoidance operation along the avoidance route based on a result of the detection, wherein:

the plurality of detection area candidates includes an avoidance route detection area including the avoidance route, a front detection area set in front of the avoidance route detection area, and a rear detection area set behind the avoidance route detection area, when the traveling direction of the lane in which the avoidance target is set is the same as the traveling direction of the host vehicle, the processing device selects the avoidance route detection area and the rear detection area from among the plurality of detection area candidates as the entering object detection area, and does not select the front detection area as the entering object detection area, the processing device determines a length of the rear detection area in a direction along the traveling direction of the host vehicle based on traveling speed information of the lane in which the avoidance target is set, when a collision is predicted between the host vehicle and the object present in front of the host vehicle, the processing device sets the avoidance target outside a host vehicle traveling lane that is a lane in which the host vehicle travels, and before performing a process of determining whether to execute the avoidance operation along the avoidance route, the processing device outputs a control signal to a steering device to move the host vehicle to a side in the host vehicle traveling lane, the side being close to the avoidance target.

2. An in-vehicle electronic control device comprising a processing device that acquires object information of an object detected by each of a plurality of external sensors mounted on a host vehicle and executes an integration process to integrate a plurality of pieces of the object information acquired, wherein the processing device is configured to:

recognize a travelable area on a road surface around the host vehicle that the host vehicle enters, based on a result of the integration process, predict whether the host vehicle and the object will collide, based on the object information, set an avoidance target for avoiding a collision with the object predicted to collide when a collision between the host vehicle and the object are predicted, generate an avoidance route in the travelable area, the avoidance route leading to the avoidance target, set an entering object detection area around the host vehicle to detect entry of the object, set a plurality of detection area candidates along a traveling direction of the host vehicle, select one or more of the detection area candidates as the entering object detection area from among the plurality of detection area candidates, based on a relationship between a traveling direction of a lane in which the avoidance target is set and a traveling direction of the host vehicle, and detect the object having entered the entering object detection area based on the object information of the object before the integration process, the object having been detected by the plurality of external sensors, and determine whether to execute an avoidance operation along the avoidance route based on a result of the detection, wherein:

the plurality of detection area candidates includes an avoidance route detection area including the avoidance route, a front detection area set in front of the avoidance route detection area, and a rear detection area set behind the avoidance route detection area, when the traveling direction of the lane in which the avoidance target is set is opposite to the traveling direction of the host vehicle, the processing device selects the avoidance route detection area and the front detection area from among the plurality of detection area candidates as the entering object detection area, and does not select the rear detection area as the entering object detection area, the processing device determines a length of the front detection area in a direction along the traveling direction of the host vehicle based on traveling speed information of the lane in which the avoidance target is set, when a collision is predicted between the host vehicle and the object present in front of the host vehicle, the processing device sets the avoidance target outside a host vehicle traveling lane that is a lane in which the host vehicle travels, and before performing a process of determining whether to execute the avoidance operation along the avoidance route, the processing device outputs a control signal to a steering device to move the host vehicle to a side in the host vehicle traveling lane, the side being close to the avoidance target.

* * * * *